US011881936B2

(12) United States Patent
Thies

(10) Patent No.: US 11,881,936 B2
(45) Date of Patent: *Jan. 23, 2024

(54) E-MAIL TESTING AND RENDERING PLATFORM

(71) Applicant: Email on Acid, LLC, San Antonio, TX (US)

(72) Inventor: John Thies, Highlands Ranch, CO (US)

(73) Assignee: Email on Acid, LLC, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/314,498

(22) Filed: May 7, 2021

(65) Prior Publication Data

US 2022/0052971 A1 Feb. 17, 2022

Related U.S. Application Data

(63) Continuation of application No. 16/682,590, filed on Nov. 13, 2019, now Pat. No. 11,019,009.

(60) Provisional application No. 62/760,688, filed on Nov. 13, 2018.

(51) Int. Cl.
| | |
|---|---|
| *H04L 51/08* | (2022.01) |
| *H04L 51/23* | (2022.01) |
| *G06F 16/955* | (2019.01) |
| *G06F 40/14* | (2020.01) |
| *G06F 40/205* | (2020.01) |

(52) U.S. Cl.
CPC ............ *H04L 51/08* (2013.01); *G06F 16/955* (2019.01); *G06F 40/14* (2020.01); *G06F 40/205* (2020.01); *H04L 51/23* (2022.05)

(58) Field of Classification Search
CPC ....... H04L 51/08; H04L 51/30; G06F 16/955; G06F 40/14; G06F 40/205
See application file for complete search history.

(56) References Cited

U.S. PATENT DOCUMENTS

| | | | |
|---|---|---|---|
| 9,037,914 B1 | 5/2015 | Au et al. | |
| 10,423,709 B1* | 9/2019 | Bradley | ................ G06F 40/216 |
| 11,019,009 B2 | 5/2021 | Thies | |

(Continued)

OTHER PUBLICATIONS

Fan, Hua, "Office Action Regarding U.S. Appl. No. 16/682,590", dated Jan. 7, 2020, p. 12, Published in: US.

(Continued)

*Primary Examiner* — Hua Fan
(74) *Attorney, Agent, or Firm* — Neugeboren O'Dowd PC

(57) ABSTRACT

A method for automatically modifying hyper-text markup language (HMTL) code of an e-mail within an email pre-deployment platform comprises receiving previously-created e-mail content comprising a plurality of e-mail content types, each of the e-mail content types written in HMTL code, automatically detecting, by parsing the received HTML code, one or more deficiencies in the e-mail content, identifying the one or more deficiencies in the HTML of the e-mail content types for a user by presenting a natural language explanation of the one or more deficiencies on the user interface, guiding a user of the platform to rectify the one or more deficiencies in the e-mail content by using one or more user interface tools for rectifying the one or more deficiencies; and automatically editing the HTML code based on the user's use of the one or more user interface tools.

18 Claims, 37 Drawing Sheets

(56) References Cited

U.S. PATENT DOCUMENTS

| | | | | |
|---|---|---|---|---|
| 11,144,441 | B1* | 10/2021 | Colwell | G06F 11/3476 |
| 2003/0041126 | A1* | 2/2003 | Buford | G06Q 10/107 |
| | | | | 709/220 |
| 2007/0039038 | A1* | 2/2007 | Goodman | H04L 63/1441 |
| | | | | 726/2 |
| 2010/0312547 | A1* | 12/2010 | Van Os | G06F 3/167 |
| | | | | 704/9 |
| 2011/0022387 | A1* | 1/2011 | Hager | G10L 15/26 |
| | | | | 704/235 |
| 2011/0037767 | A1 | 2/2011 | Casanova et al. | |
| 2011/0264705 | A1 | 10/2011 | Diamond | |
| 2013/0166657 | A1 | 6/2013 | Tadayon | |
| 2015/0095084 | A1 | 4/2015 | Cordasco et al. | |
| 2015/0106928 | A1* | 4/2015 | Steinmann | H04L 63/145 |
| | | | | 726/23 |
| 2015/0161087 | A1* | 6/2015 | Khoo | G06F 16/957 |
| | | | | 715/234 |
| 2016/0059136 | A1 | 3/2016 | Ferris | |
| 2016/0140328 | A1* | 5/2016 | Pathak | G06F 21/6209 |
| | | | | 726/1 |
| 2019/0005389 | A1 | 1/2019 | Glyman et al. | |
| 2020/0153771 | A1 | 5/2020 | Thies | |

OTHER PUBLICATIONS

Fang, Hua, "Office Action Regarding U.S. Appl. No. 16/682,590", dated Apr. 28, 2020, p. 13, Published in: US.

Fan, Hua, "Office Action Regarding U.S. Appl. No. 16/682,590", dated Dec. 10, 2020, p. 14, Published in: US.

Neugeboren, Craig, "Response to Office Action Regarding U.S. Appl. No. 16/682,590", dated Mar. 4, 2021, p. 12, Published in: US.

Otero, Vanessa, "Response to Office Action Regarding U.S. Appl. No. 16/682,590", dated Apr. 1, 2020, p. 13, Published in: US.

Otero, Vanessa, "Response to Final Office Action Regarding U.S. Appl. No. 16/682,590", dated Jun. 18, 2020, p. 14, Published in: US.

* cited by examiner

URL Validation

Step 3 of 3

Validate your campaign parameters ⓘ

Recommended Parameters    Additional Parameters

We recommend using the same source, medium and name for URLs in your campaign.

*Required fields

Campaign Source* — 1910
Referral traffic source (e.g., google, newsletter, twitter)

⚠ We found multiple sources in your URLs

Choose one campaign source to use for all URLs:
- ○ newsletter
- ○ twitter
- ○ Create new

Campaign Medium — 1920
Marketing channel or campaign type (e.g., email)

[ email ]

Campaign Name — 1930
Product, promo code, or slogan (e.g., spring_sale)

[ campaign_precheck ]

[ PREVIOUS ]    [ NEXT ]

Email Previews

Subject line: [        ] ~ 3310

Email clients: [All Clients ▼]

⊗ *Create new email client profile*

☐ Run a test with image blocking (where available)    [RUN TEST]

All Clients (118 of 118 selected)

3320

Mobile

| | | | | |
|---|---|---|---|---|
| iPad Air | iPad Air<br>iOS 10 | iPad Air<br>iOS 11 | | |
| iPad Air 2 | iPad Air 2<br>iOS 12 | | | |
| iPad Mini | iPad Mini<br>iOS 10 | iPad Mini<br>iOS 11 | | |
| iPad Pro | iPad Pro (12.9-inch)<br>iOS 10 | iPad Pro (12.9-inch)<br>iOS 11 | iPad Pro (10.5-inch)<br>iOS 11 | iPad Pro (12.9-inch)<br>iOS 12 |

[PREVIOUS]    [NEXT]

E-MAIL TESTING AND RENDERING PLATFORM

CROSS-REFERENCE TO RELATED APPLICATIONS

This application is a Continuation of U.S. application Ser. No. 16/682,590, filed Nov. 13, 2019, and entitled "E-MAIL TESTING AND RENDERING PLATFORM", now issued as U.S. Pat. No. 11,019,009; which claims priority to U.S. Provisional Application No. 62/760,688, filed Nov. 13, 2018, and entitled "E-MAIL TESTING AND RENDERING PLATFORM", the entire disclosure of which is hereby incorporated by reference for all purposes.

FIELD OF THE DISCLOSURE

The present disclosure relates generally to pre-deployment e-mail validation. In particular, but not by way of limitation, the present disclosure relates to systems, methods, and apparatuses for ensuring proper preparation, delivery, and display of e-mails to and through various e-mail service providers.

BACKGROUND

Organizations that rely on e-mail for marketing often send out e-mails to very large distribution lists. Often, these lists are built up over long periods of time and/or at great expense. In order to maximize return (such as clicks, website views, and purchases) through these e-mails, these organizations often devote significant resources to refining their e-mail processes. Organizations often want to ensure that they are e-mailing potential customers with appropriate frequency, with effective messages, and with minimal interference from e-mail delivery and display problems. Further, organizations want to ensure the content delivered within their e-mails is of high quality; that is, that important aspects of the e-mail, such as images, text, and links, are correctly displayed and otherwise optimized for presentation. Therefore, they often employ professional marketing staff, web developers, and quality assurance testers to improve e-mail quality and effectiveness.

There are several mass e-mail delivery services that help marketers create and send e-mails, but they do not address many of the concerns that large, sophisticated e-mail marketers have. These marketers often spend more time than is desired on checking and rechecking aspects of these e-mails, only to realize that a large number of e-mails experienced issues with delivery, broken links, broken images, accessibility, grammar and spelling, or readability that were undetectable from just human review. Such e-mail problems are a source of stress for marketers, developers, and quality assurance specialists. A need exists to remedy the deficiencies of existing processes.

BRIEF DESCRIPTION OF THE FIGURES

FIG. 1 shows an exemplary interface of the e-mail pre-deployment platform showing a step of loading or entering a previously created e-mail;

FIG. 3 shows an exemplary interface of the e-mail pre-deployment platform showing a source code showcase display section;

FIG. 5 shows an exemplary interface of the e-mail pre-deployment platform showing a preview screen for an accessibility workflow;

FIG. 8 shows an exemplary interface of the e-mail pre-deployment platform showing a step of the accessibility workflow related to title attributes;

FIG. 10 shows an exemplary interface of the e-mail pre-deployment platform showing a step of the accessibility workflow related to contrast ratio;

FIG. 11 shows an exemplary interface of the e-mail pre-deployment platform showing a step of the accessibility workflow related to link accessibility;

FIG. 12 shows an exemplary interface of the e-mail pre-deployment platform showing another step of the accessibility workflow related to link accessibility;

FIG. 13 shows an exemplary interface of the e-mail pre-deployment platform showing a step of the accessibility workflow related to color visual impairment;

FIG. 14 shows an exemplary interface of the e-mail pre-deployment platform showing a step of the accessibility workflow also related to color visual impairment as it would appear to a user with a color visual impairment;

FIG. 16 shows an exemplary interface of the e-mail pre-deployment platform showing a step of preview screen for a URL validation workflow;

FIG. 18 shows an exemplary interface of the e-mail pre-deployment platform showing a step of the URL validation workflow related to resolving URLs;

FIG. 19 shows an exemplary interface of the e-mail pre-deployment platform showing a step of the URL validation workflow related to campaign parameters;

FIG. 20 shows an exemplary interface of the e-mail pre-deployment platform showing a step of the URL validation workflow related to additional campaign parameters;

FIG. 21 shows an exemplary interface of the e-mail pre-deployment platform showing a preview screen of an image validation workflow;

FIG. 22 shows an exemplary interface of the e-mail pre-deployment platform showing a step of the image validation workflow related to image styling;

FIG. 25 shows an exemplary interface of the e-mail pre-deployment platform showing a preview screen of a content validation workflow;

FIG. 27 shows an exemplary interface of the e-mail pre-deployment platform showing a preview screen of a deliverability workflow;

Figure 28:
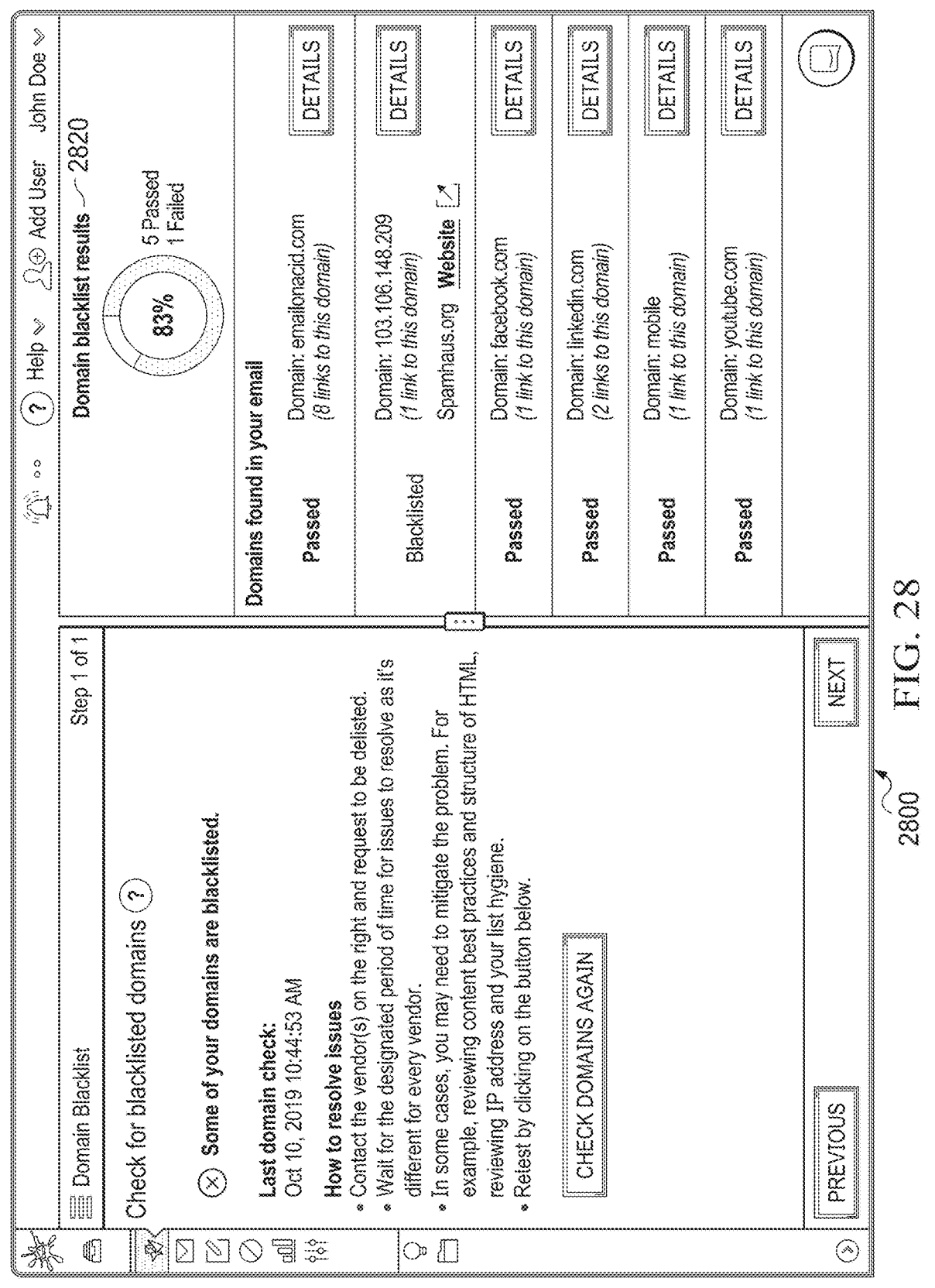

FIG. 28 shows an exemplary interface of the e-mail pre-deployment platform showing a step of the deliverability workflow related to domain blacklists;

FIG. 29 shows an exemplary interface of the e-mail pre-deployment platform showing another preview screen of a deliverability workflow related to additional aspects of deliverability;

FIG. 30 shows an exemplary interface of the e-mail pre-deployment platform showing a step of the deliverability workflow related to spam checking;

FIG. 33 shows an exemplary interface of the e-mail pre-deployment platform showing a step of email previewing across a plurality of mobile devices;

FIG. 34 shows an exemplary interface of the e-mail pre-deployment platform showing a step of email previewing across a plurality of mobile devices and operating systems;

SUMMARY

Figure 2:
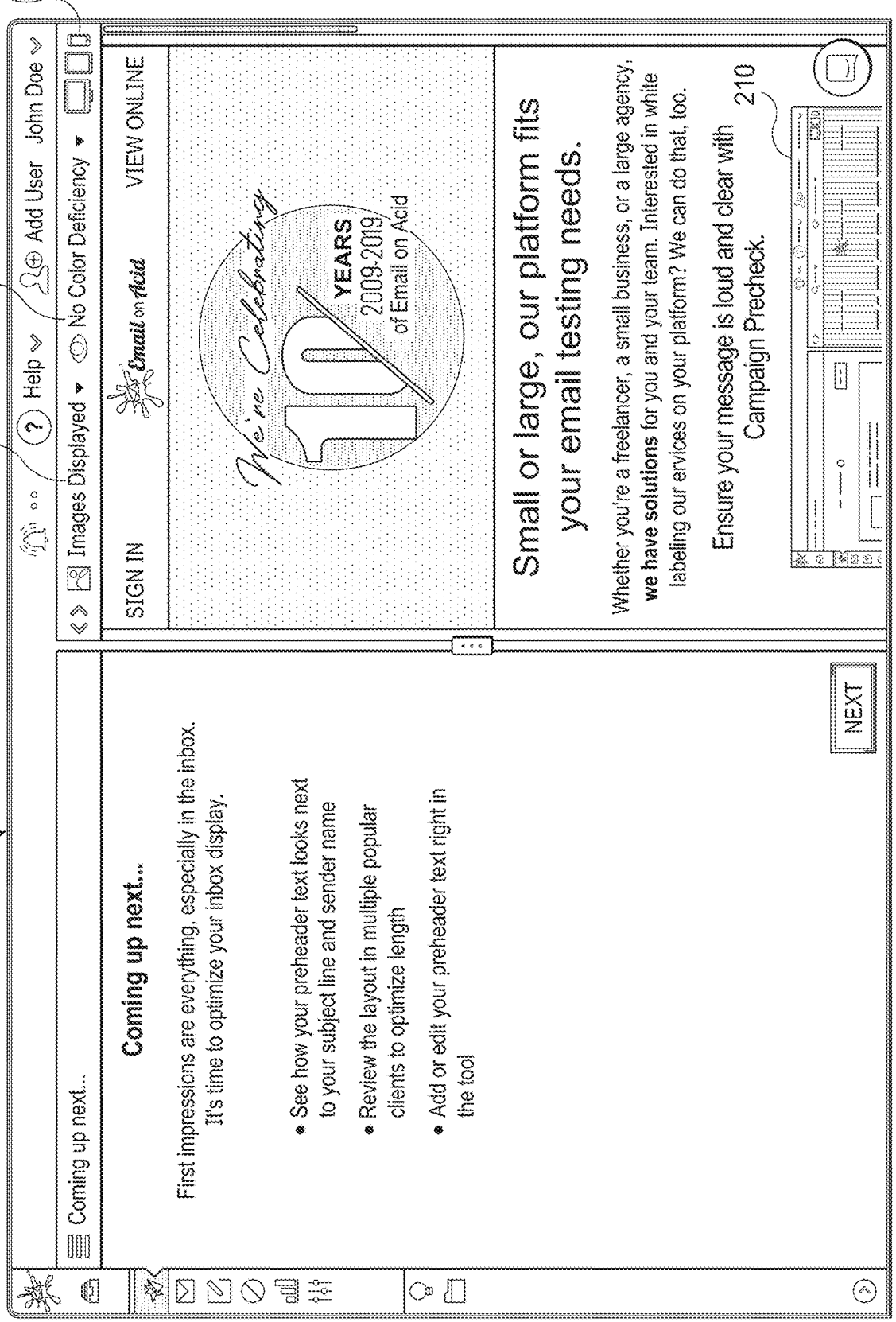
FIG. 2 shows an exemplary interface of the e-mail pre-deployment platform showing a preview screen for an Inbox Display workflow.

An aspect of the present disclosure provides a method for automatically modifying hyper-text markup language (HMTL) code of an e-mail within an email pre-deployment platform. The method may comprise receiving previously-created e-mail content comprising a plurality of e-mail content types, each of the e-mail content types written in HMTL code. The method may then comprise automatically detecting, by parsing the received HTML code, one or more deficiencies in the e-mail content and identifying the one or more deficiencies in the HTML of the e-mail content types for a user by presenting a natural language explanation of the one or more deficiencies on the user interface. The method may further comprise guiding a user of the platform to rectify the one or more deficiencies in the e-mail content by using one or more user interface tools for rectifying the one or more deficiencies and then automatically editing the HTML code based on the user's use of the one or more user interface tools.

Yet another aspect of the disclosure provides a non-transitory, computer-readable storage medium, configured with processor-readable instructions to perform a method for automatically modifying hyper-text markup language (HMTL) code of an e-mail within an email pre-deployment platform. The method may comprise receiving previously-created e-mail content comprising a plurality of e-mail content types, each of the e-mail content types written in HMTL code. The method may then comprise automatically detecting, by parsing the received HTML code, one or more deficiencies in the e-mail content and identifying the one or more deficiencies in the HTML of the e-mail content types for a user by presenting a natural language explanation of the one or more deficiencies on the user interface. The method may further comprise guiding a user of the platform to rectify the one or more deficiencies in the e-mail content by using one or more user interface tools for rectifying the one or more deficiencies and then automatically editing the HTML code based on the user's use of the one or more user interface tools.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The system and methods of the present disclosure may be best understood by referring to screenshots of the email pre-deployment platform depicting its various features. Aspects of the disclosure allow users to test e-mails for numerous quality issues before sending them out. The term "user" in this disclosure may be used to refer to marketers, developers, and quality assurance analysts somewhat interchangeably. Many marketers send hundreds of thousands, or millions of e-mails at a time, and because these e-mails are received by many different people, on many different types of computing devices, through many different e-mail servers, there are a multitude of ways an e-mail can fail to be properly sent, received, interacted with, rendered, and viewed. In particular, there are various ways that content can show up incorrectly or in a non-optimized fashion. For example, images may be blocked or fail to display, text may be spelled incorrectly or be difficult to read for some users, and links maybe difficult to view, among other examples. These issues related to incorrect or non-optimized content may be addressed through aspects of the e-mail pre-deployment platform broadly referred to as "content validation". Content validation may generally refer any to functions of the platform which pertain to checking, validating, and reviewing pieces of content in an e-mail. This content validation may be performed systematically and/or automatically, and may refer to the checking, validating, and reviewing of content via the HTML of an e-mail. Corrections and optimizations may be applied directly and automatically to the HTML. Each type of failure or non-validated content can result in lost opportunity for the sender. The features described herein provide ways to reduce these failures.

Figure 1:
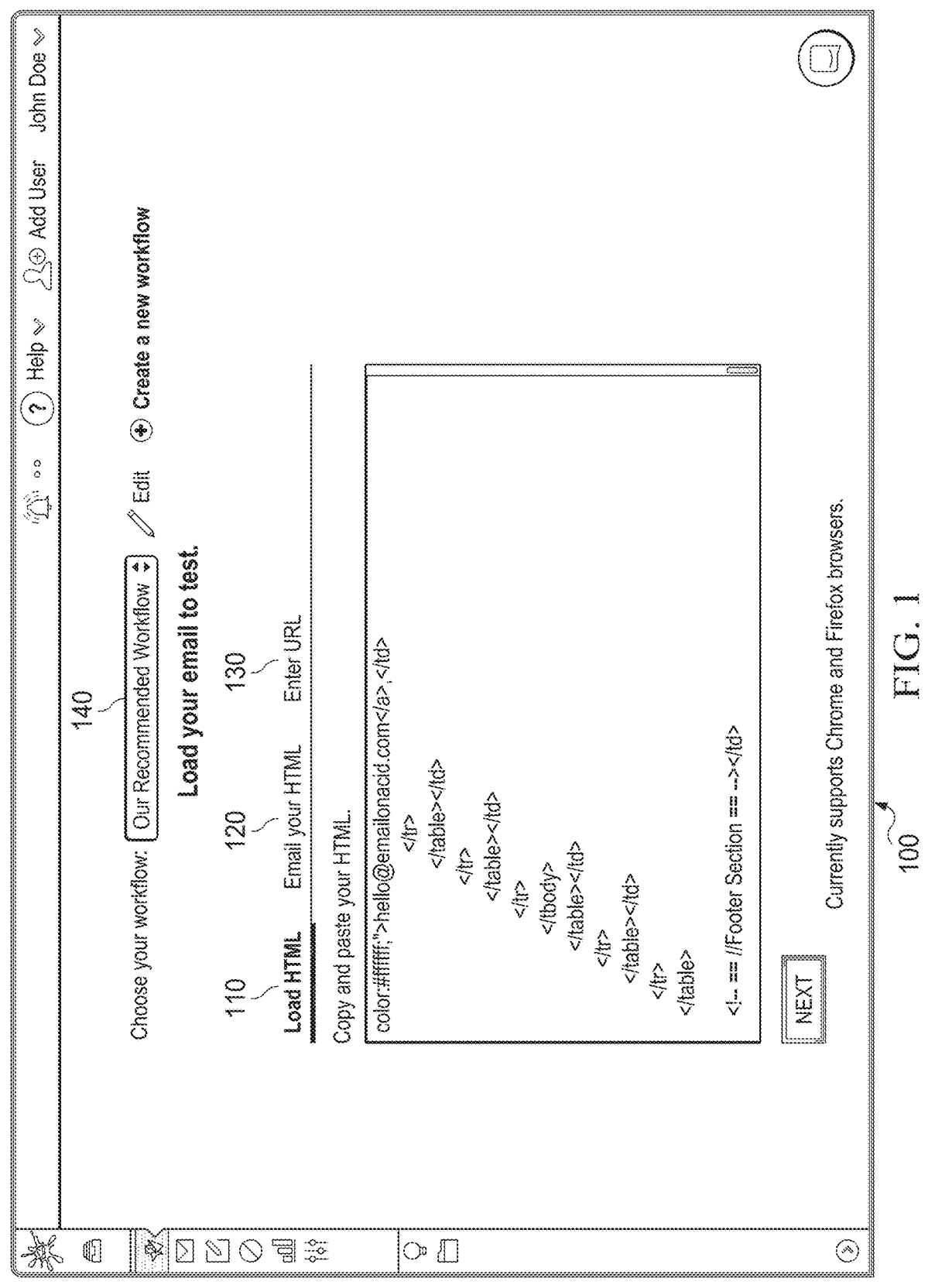

FIG. 1 shows an exemplary beginning screen 100 that asks a user if they have the content of the e-mail the user wants to start a "campaign precheck process" or the present disclosure by submitting their HTML (hypertext markup language) in an input field or supplying a URL. Often, professional e-mail marketers will write the content of the e-mail from scratch, in HTML code, or use predefined templates for maximum control of the content. The present disclosure is directed to methods for checking, validating, editing, optimizing, and otherwise improving e-mails that have already been created by a user. The terms "e-mail content" and "HTML code" used to create the email may be used somewhat interchangeably throughout the disclosure. The e-mail content on which the methods of the present disclosure are performed may be referred to as an e-mail that has been "previously created". It may refer to any e-mails created by a user in any format, in any way. In embodiments, another portion of the e-mail pre-deployment platform may be used to create the e-mail whose HTML is then provided to the platform. The screen 100 in FIG. 1 shows that a user may enter content via a Load HTML input field 110, or an Email your HTML input function 120, or an Enter URL field 130. In other embodiments, users may send their email content and its underlying HTML code to the email pre-deployment platform provider via other methods, such as their Email Service Provider (ESP) or APIs.

This screen 100 also allows the user to select, in drop down menu 140, a particular workflow, which will be described in subsequent screens. Though the Figures show various aspects of a specific e-mail pre-deployment workflow in a given order, the features and functions shown herein can be implemented in any order without departing from the scope of the disclosure. The present disclosure provides numerous ways to check and validate existing email content for many sorts of deficiencies and then automatically edit the HTML code to automatically remedy the deficiencies. The platform of the present disclosure allows a user to perform simple actions, using tools on a user interface such as an input field for entering text or a button to click, and the platform makes direct edits to the HTML code for the user in response. Users to not need to be able to delete or write HTML code directly. In the present disclosure, the term "deficiency," as it relates to a portion of e-mail content, can mean several things. In some instances, it can refer to an error or a mistake, such as a misspelled word in text or a broken hyperlink. In other instance, it can mean that content is merely sub-optimal for accessibility, performance, or aesthetic appeal. For example, text that shows up with sub-optimal contrast for visually impaired viewers, images that take a long time to load, or a strange-looking first frame of a GIF animation are not necessarily mistakes or errors, but they can negatively impact an e-mail's performance, and are therefore referred to herein as "deficiencies."

In embodiments, a user can indicate that the content is not in HTML or at a URL. For example, the user may have the e-mail in a template preloaded in their e-mail service provider ("ESP," such as MailChimp®, SendGrid®, and others). In such embodiments, the user may have the option to send an email from the ESP to the e-mail application platform of the present disclosure. In embodiments, the user sending the email may be remote from the platform provider. The e-mail application which is the subject matter of the present disclosure may be referred to herein as the "system" or "platform". The platform may automatically receive the email and initiate the campaign precheck process. The user can still select the workflow from the first screen or a similar one.

In embodiments, the platform may allow the user to edit or add new workflows. Workflows may comprise a series of checks and automatic update processes that are available to a user within the platform. A user may select all of the available processes, or just some of them. It is contemplated that in embodiments, a user may change the order of the processes. A user may also save a particular selection and order of processes for a future workflow. This feature allows users to save time by customizing the workflow to include exactly the precheck and rendering processes they need. If users send out similar types of e-mails often, or if they have a predefined precheck quality assurance (QA) process through which they need to run their emails, the workflows for each will likely be similar. The workflow may have several workflow processes available.

Another unique aspect of the disclosure is a dynamic rendering window that is shown alongside a user's testing and editing workspace. In FIG. 2, a workflow preview screen 200 shows the testing and editing workspace 205 on the left and the dynamic rendering window 210 on the right. The dynamic rendering window 210 may also be referred to as a "viewing pane". The dynamic rendering window makes changes in real time or substantially real time to the displayed e-mail content when a user makes an edit, selection, or input in the testing and editing workspace. The dynamic rendering window may have several additional features, such as a zoom tool and a drop down menu 215 that shows items that may be color deficient (as will be described in further detail) in the rendered e-mail. The zoom tool may allow a user to zoom to view the content of the rendering window at 200%, for example. Such a zoom tool may also be available in the Accessibility workflow in embodiments. It may also have a selector 220 to show how the email will look with images turned off, as well as selectors 225 for mobile, tablet, and desktop versions of the rendering. These selectors allow the user to see any display issues resulting from the computing device viewing format.

Figure 3:
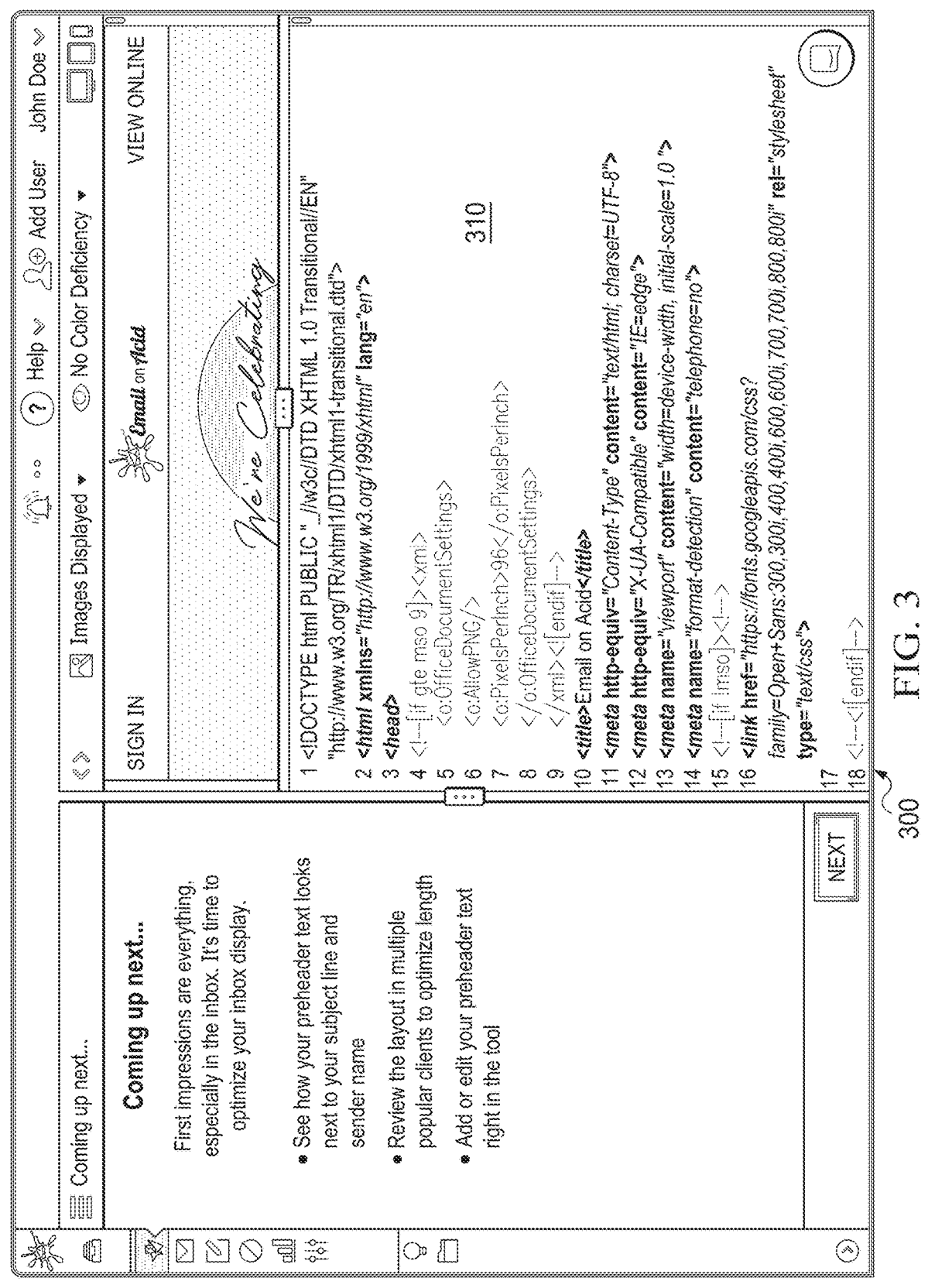

FIG. 3 shows another screen 300 and an additional feature enabled through the toolbar, which is a source code showcase 310, in which a user can view what changes are automatically being made to source code as they use the user interface tools workflow to rectify issues with various types of content within the emails. The HTML may dynamically, and in real-time or substantially real-time, be altered and displayed to the user as the user interacts with the user interface tools. For the purposes of the present disclosure, real-time means within an amount of time that is undetectable or nearly undetectable to a human, and substantially real-time means, in some embodiments, within less than five seconds, and in some embodiments, within less than one second.

Figure 4:
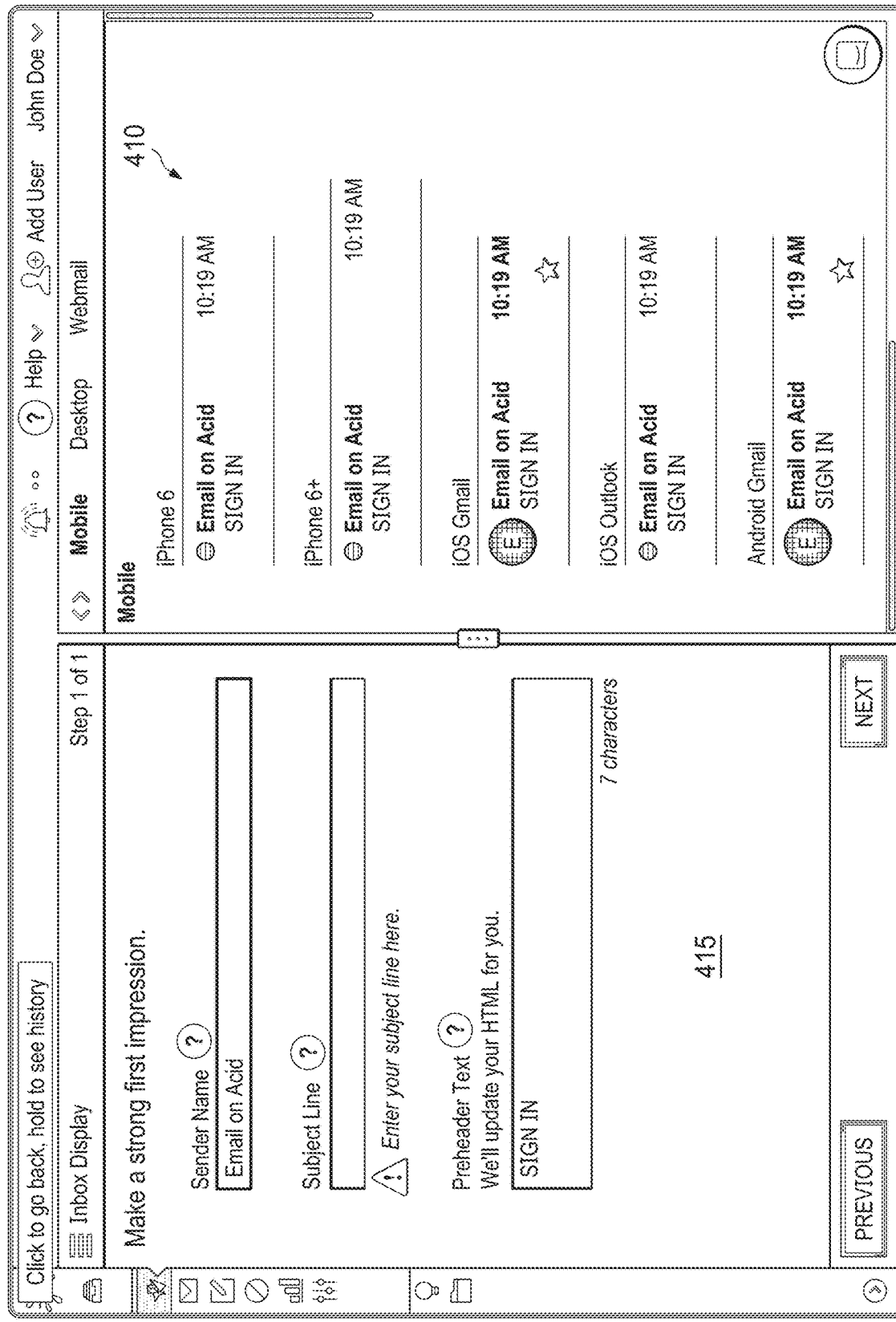
FIG. 4 shows an exemplary interface of the e-mail pre-deployment platform showing a step of an Inbox Display workflow.

Another aspect of the system of the present disclosure is testing for problems with the "Inbox Display," which may also be referred to as "preheader text". This feature may constitute a separate workflow, and is shown in FIGS. 2-4. FIGS. 2 and 3 show in the editing workspace 200 that the upcoming step in the user's particular workflow is checking the Inbox Display or preheader text. A preheader is the text that is shown as a preview after the subject in most e-mail inboxes. It is an important marketing tool to encourage recipients to open the e-mail. The right-most part of the Inbox Display screen 400 in FIG. 4 is a testing window 410, which shows how the preheader will be rendered across multiple e-mail inboxes, and may highlight ones that may be problematic. Five e-mail inbox example displays are shown in the testing window 410. If there are any deficiencies in preheader text, these may be shown as having problems such as not displaying any preheader text or showing an undesired layout. The user may then edit the preheader in this screen or other screens of the workflow. If there is no predefined preheader text in the existing email, this process will automatically create it based on what the user types in the preheader text input field 415. If the email contains preheader text, the system will update the existing preheader with what is entered in the preheader text input field 415. Another feature that may be implemented in this workflow is the ability to listen to how Ski (the Apple iOS's voice-activated digital assistant system) or other assistive reading applications or devices will read the emails out loud. This feature is especially useful given the increase in consumers' use of voice-activated digital assistants to interact with mobile devices, smart speakers, navigation systems, and other computing devices.

Some e-mail service providers support the use of emojis in subject lines and preheaders, and this Inbox Display screen 400 may allow users add emojis to their preheader text and also preview how the emoji will be display in the provided email clients. Both the subject line and the preheader text line may have emoji drop-down menus to allow the user to include emojis.

Figure 5:
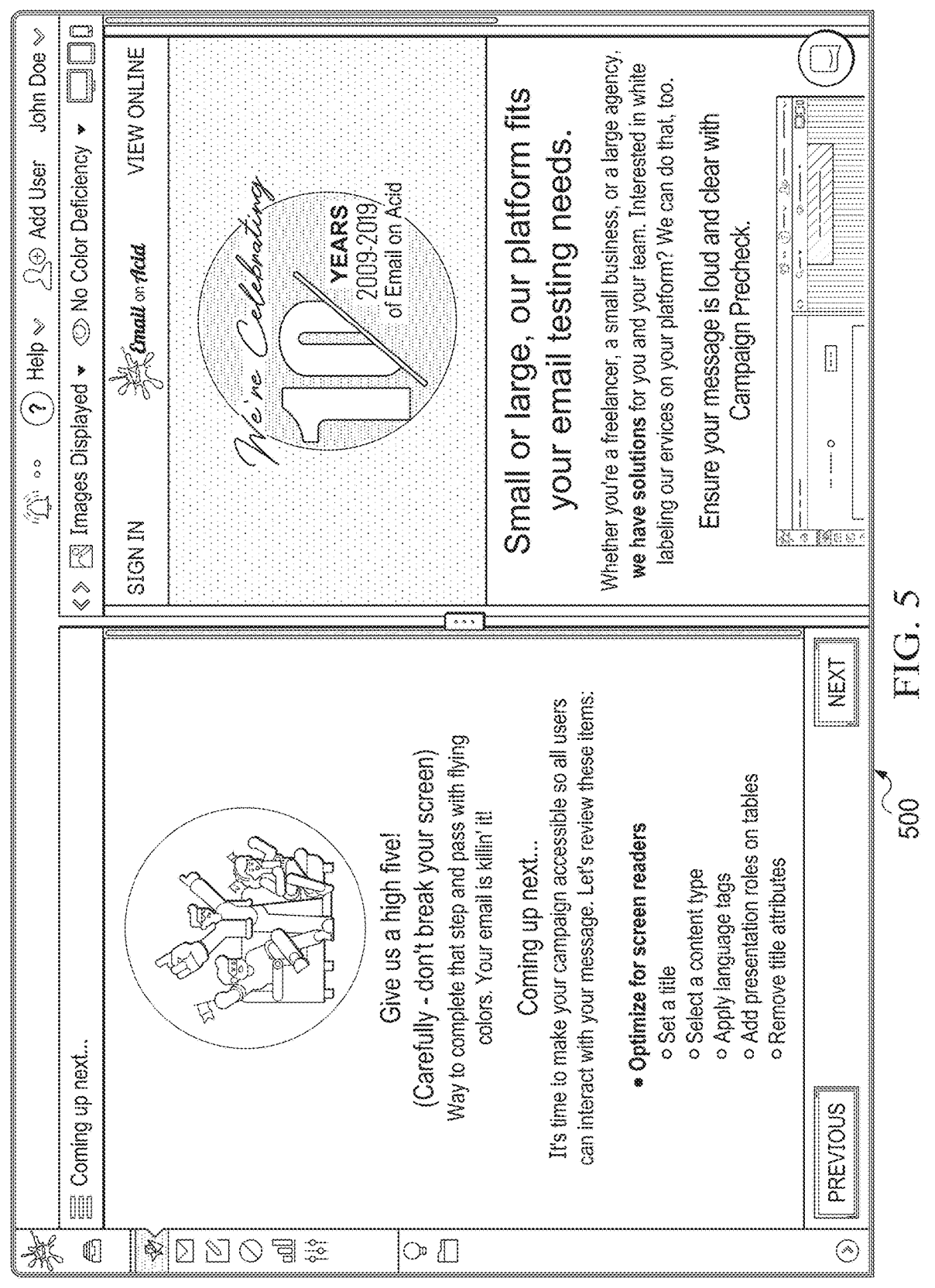

FIG. 5 shows a screen 500 which describes an available workflow process, which is to test for accessibility issues. This screen 500 describes what kinds of deficiencies and user interface tools the user can expect to see in the upcoming workflow. As described earlier, though the screens are presented in a particular order, in other embodiments, the order of steps may be different. "Accessibility" refers to the availability and optimization of features of the e-mail for individuals who may be visually or otherwise impaired. Some of the accessibility features tested for within this platform include alt-text (i.e., text associated with an image that can be read out loud to a visually impaired person), color-blindness rendering, and sufficient contrast rendering. It is contemplated that some embodiments will include additional accessibility features and functionality.

In embodiments of the disclosure, it is contemplated that one or more visual indicators may be implemented to communicate the level of testing that remains to be completed to reduce the likelihood of many e-mail failures. This may be implemented as a visual meter or progress bar. Such a visual meter or progress bar may provide an important cue to e-mail marketers that communicates that the platform is aligned with the marketer's goal of being confident when hitting the send button. Many e-mail marketers experience anxiety from the finality of sending an email, because once it is sent, the sender cannot take it back. Any possible errors (rendering issues, links not working, etc.) that marketers are concerned with within an email are irretrievable.

Figure 6:
FIG. 6 shows an exemplary interface of the e-mail testing and rendering platform showing step of the accessibility workflow related to screen readers.

Turning now to FIG. 6, this first accessibility workflow screen 600 specifically sets up the HTML code to be used with screen readers. The accessibility workflow may first check for the existence of the HTML title tag. This is important as it provides more context to the user using an assistive device (i.e., a screen reader). A user may then set an e-mail title for the screen reader in the e-mail input field 610. As shown on screen 600, the accessibility workflow provides a description about this feature which tells the user what the workflow is checking for in the title. In embodiments, the prompt may provide advice on what a good title should include from an accessibility and marketing standpoint.

FIG. 6 shows another feature of the accessibility workflow in which the "content type" is checked within the email. This feature, shown in the drop-down field 620 may be implemented by parsing the code to determine the content type, if possible, using a character encoding mechanism such as UTF-8 or ISO-8859-1. This encoding allows the implementation of accessibility features because it tells the assistive device (i.e., a screen reader) what the character encoding is of the content. This step of the workflow also checks if the email contains a global Language attribute. It is contemplated that this accessibility feature may include testing the content for mixed languages and ensure the proper language attribute (i.e. lang="en") for every HTML element that contains content that is different than a Global Language setting. A user may set the language as shown in the drop-down menu 630.

Figure 7:
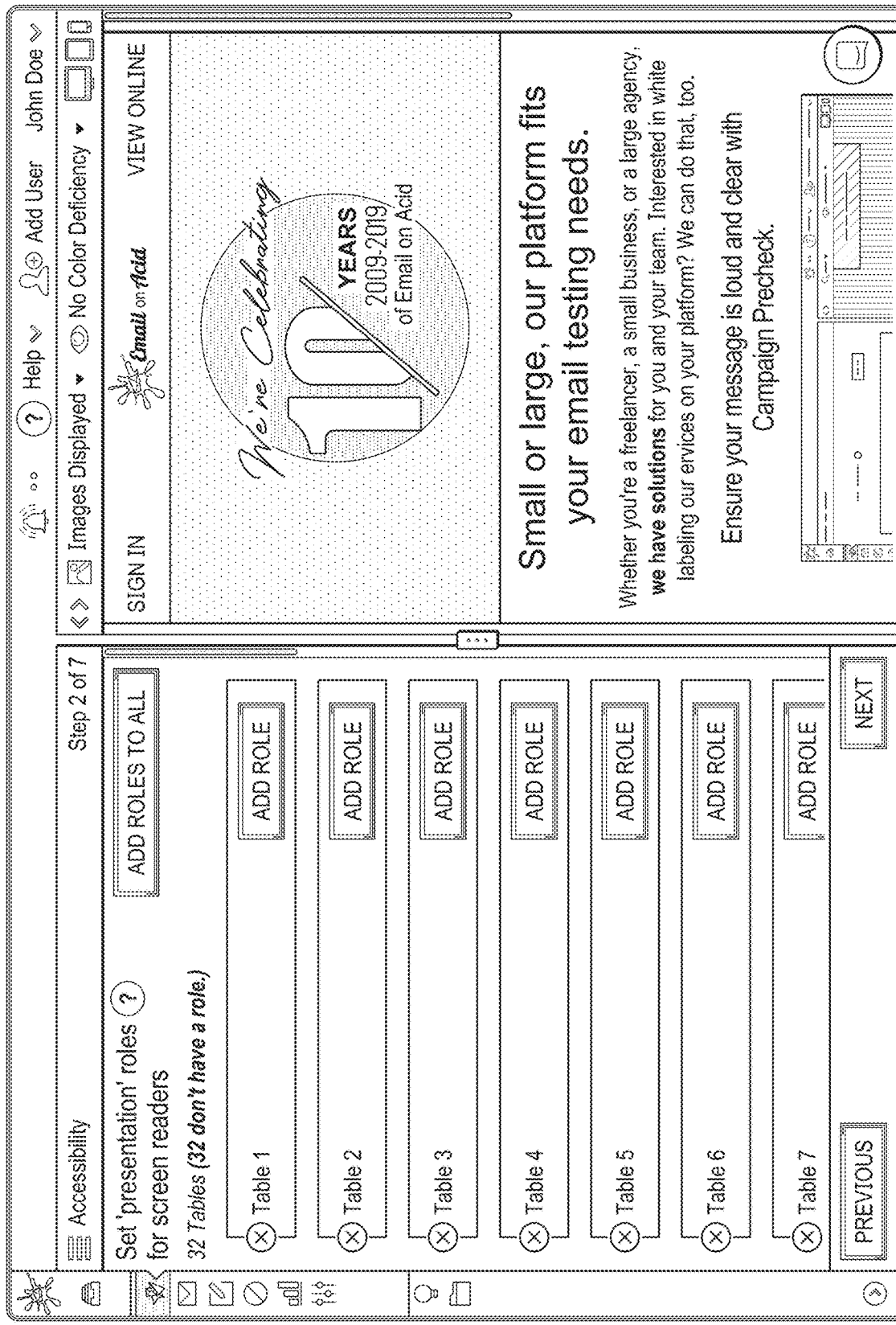
FIG. 7 shows an exemplary interface of the e-mail pre-deployment platform showing a step of the accessibility workflow related to screen readers.

FIG. 7 shows another screen 700 of the accessibility workflow for testing to ensure the TABLE tags include the "role" attribute with a value of "presentation" within an e-mail. This is an important attribute for screen readers because if it is not present it will read through all of the TR (table row) and TD (table data) HTML tags before reading the content. If the role attribute is present with a value of "presentation" the screen reader will skip the TR and TD tags and only read the content. As shown, when one or more tables has issues, they may be highlighted and an explanation link and a "fix" button may be presented to the user to correct the issues pertaining to that specific TABLE tag. If no "presentation role" is set, the system of the present disclosure adds that tag so that the screen reader only reads the relevant areas.

An advantage to having the workflow go through each possible element to assess its accessibility issues is that developers or marketers don't need to know the details of the code in order to make their emails more accessible. As previously described, the system updates the HTML directly, which is a beneficial aspect of the systems and methods of the present disclosure. It automatically adjusts the code, which is especially helpful for those that do not know how to write HTML code.

Figure 8:
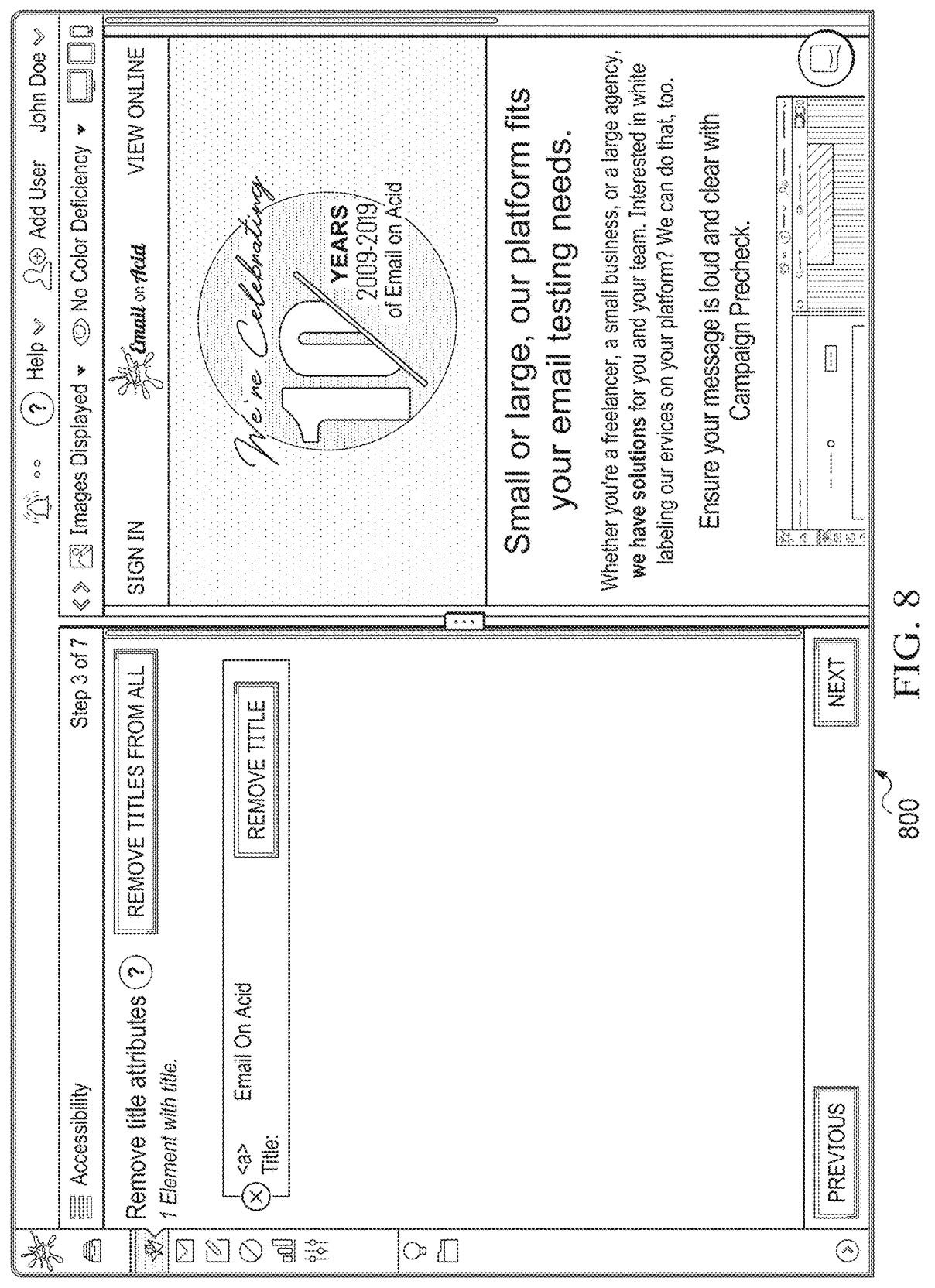

FIG. 8 shows another screen 800 of the accessibility workflow that checks for the TITLE attributes within HTML tags. TITLE attributes often do not work well with screen readers because they confuse the reader about which content to read first. A screen reader will typically read the values of the TITLE attributes first before reading any of the email's content. This step of the accessibility workflow allows the user to remove the TITLE attributes from any HTML tag.

Figure 9:
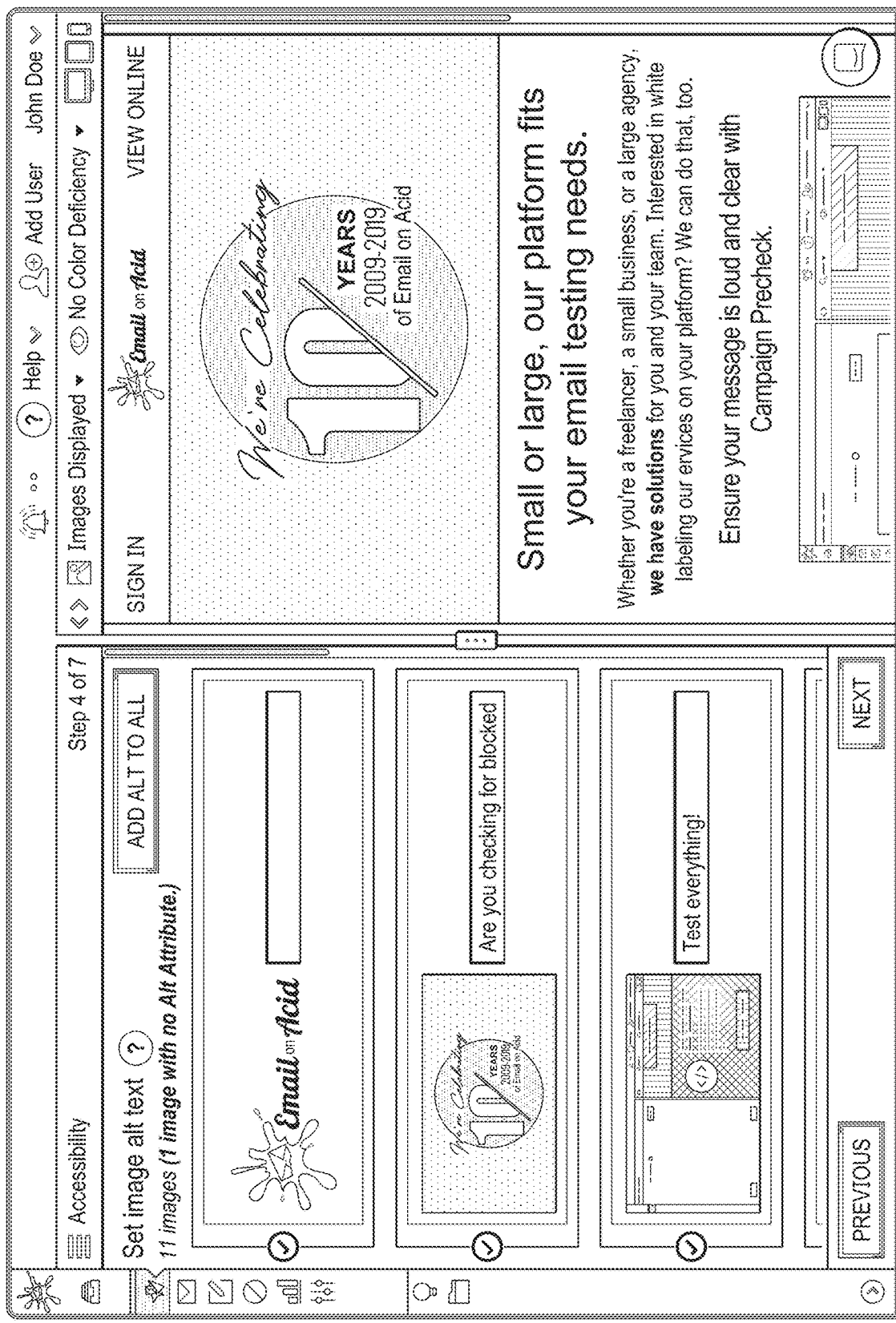
FIG. 9 shows an exemplary interface of the e-mail pre-deployment platform showing a step of the accessibility workflow related to image alt-text.

FIG. 9 shows another screen 900 of the accessibility workflow for testing issued with alt-text. One possible issue could be that alt-text is repeated for multiple images. Such a mistake may not be easily detectable to a marketer composing the e-mail, but it is certainly noticeable to an e-mail recipient who relies on screen readers to read the email. Such an oversight diminishes the experience for that e-mail recipient, which is why testing specifically for alt-text issues is important. Another aspect of this feature is that the system spell-checks alt-text in each tested field, including the title, content, and tables shown in previous figures. The system of the present disclosure checks for having "alt" attributes in place in all the correct locations. If such "alt" attributes are not present, this can cause screen reader errors such as reading a full snippet of code, rather than skipping to the alt-text that is supposed to be read itself, or alternatively, skipping over the alt-text altogether. The system of the present disclosure fixes these errors by automatically adding the alt attribute tags to the HTML and then presents boxes to the user to prompt them to enter the appropriate alt-text.

Figure 10:
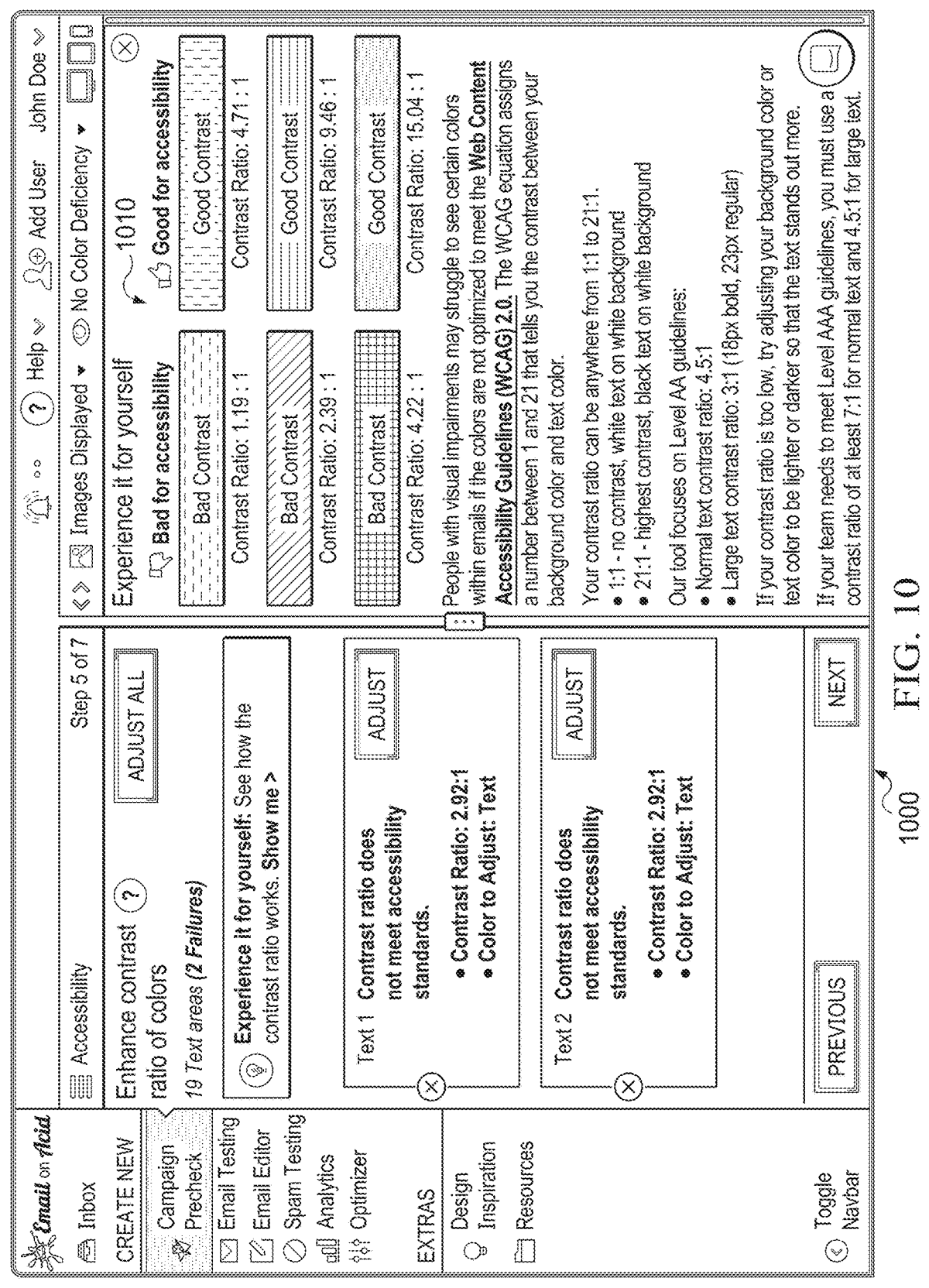

FIG. 10 shows another screen 1000 of the accessibility workflow that tests the contrast ratio for text content within the email. Sufficient contrast between a text and a background may be important to all e-mail recipients, including the visually impaired and non-visually impaired. It may be possible that a marketer or developer inadvertently selects colors that are too close; for example, a gray and a white, that appear to provide sufficient contrast in some settings but don't in others. WCAG (Web Content Accessibility Guidelines) 2 level AA requires a contrast ratio of at least 4.5:1 for normal text and 3:1 for large text. Level AAA requires a contrast ratio of at least 7:1 for normal text and 4.5:1 for large text. This accessibility workflow process checks the Level AA standards. It is contemplated that embodiments may check against the Level AAA standards and any other future-developed standards. The rendering window can show how the contrast appears across different devices and e-mail platforms. When the testing window shows that a particular area does not meet the WCAG standard, as shown in the contrast area display 1110, it will tell the user the current contrast ratio of the particular text area and provide a checkbox (or a circle or other selectable indicator) that will then automatically adjust either the foreground or background color (based on which one is closer to the color white) to make it compliant with the WCAG standards.

Figure 11:
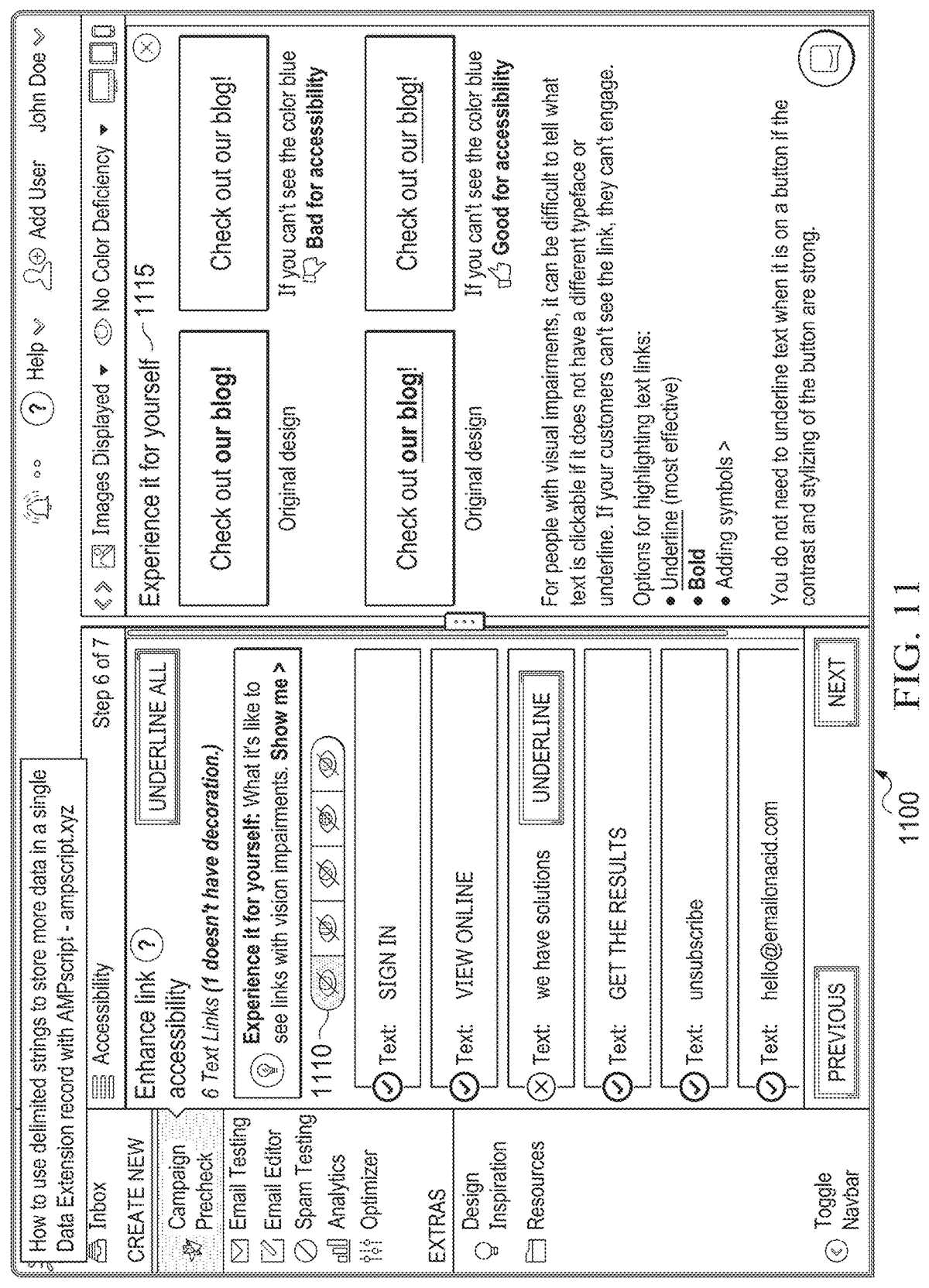
Figure 12:
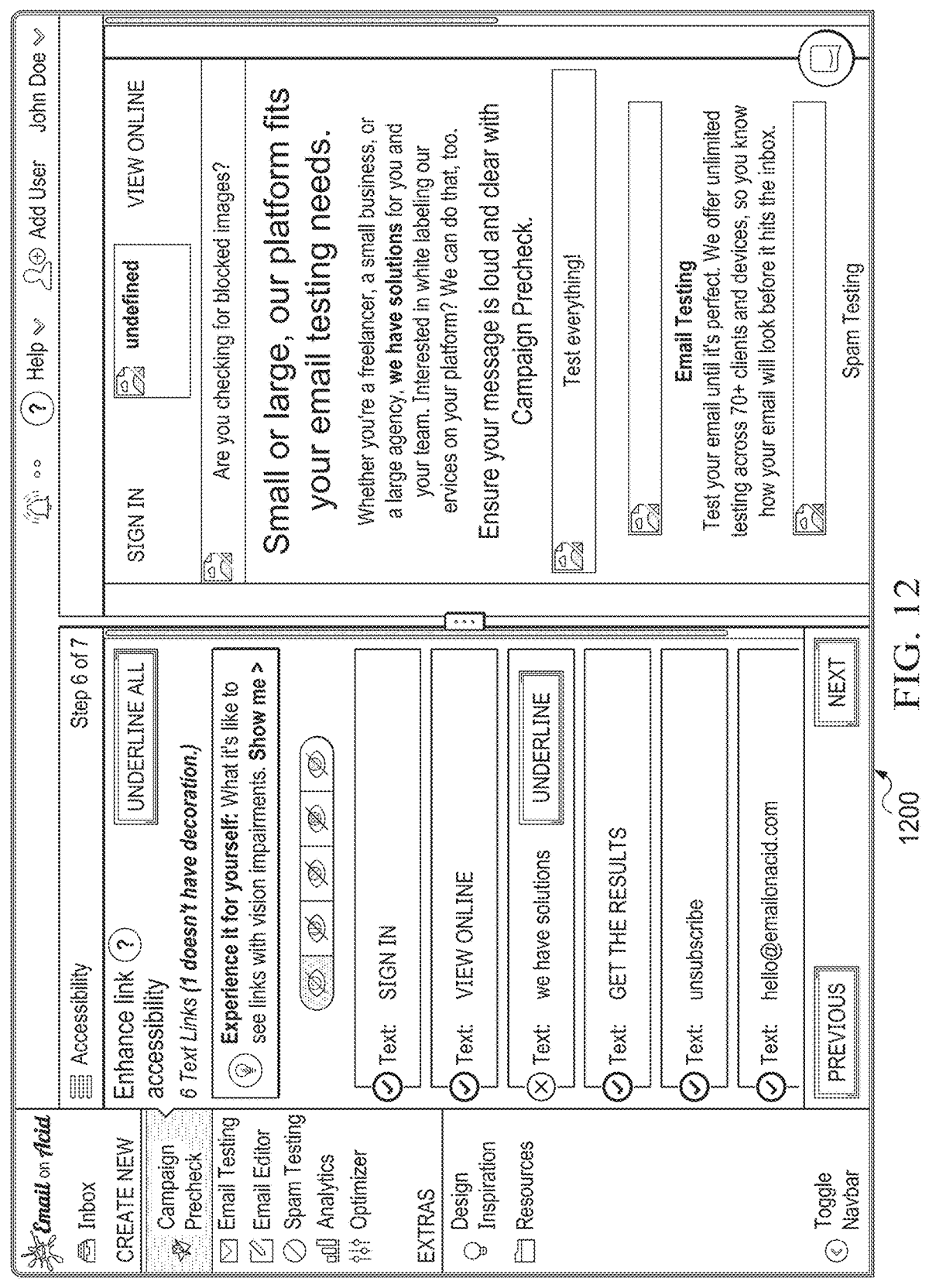
Figure 13:
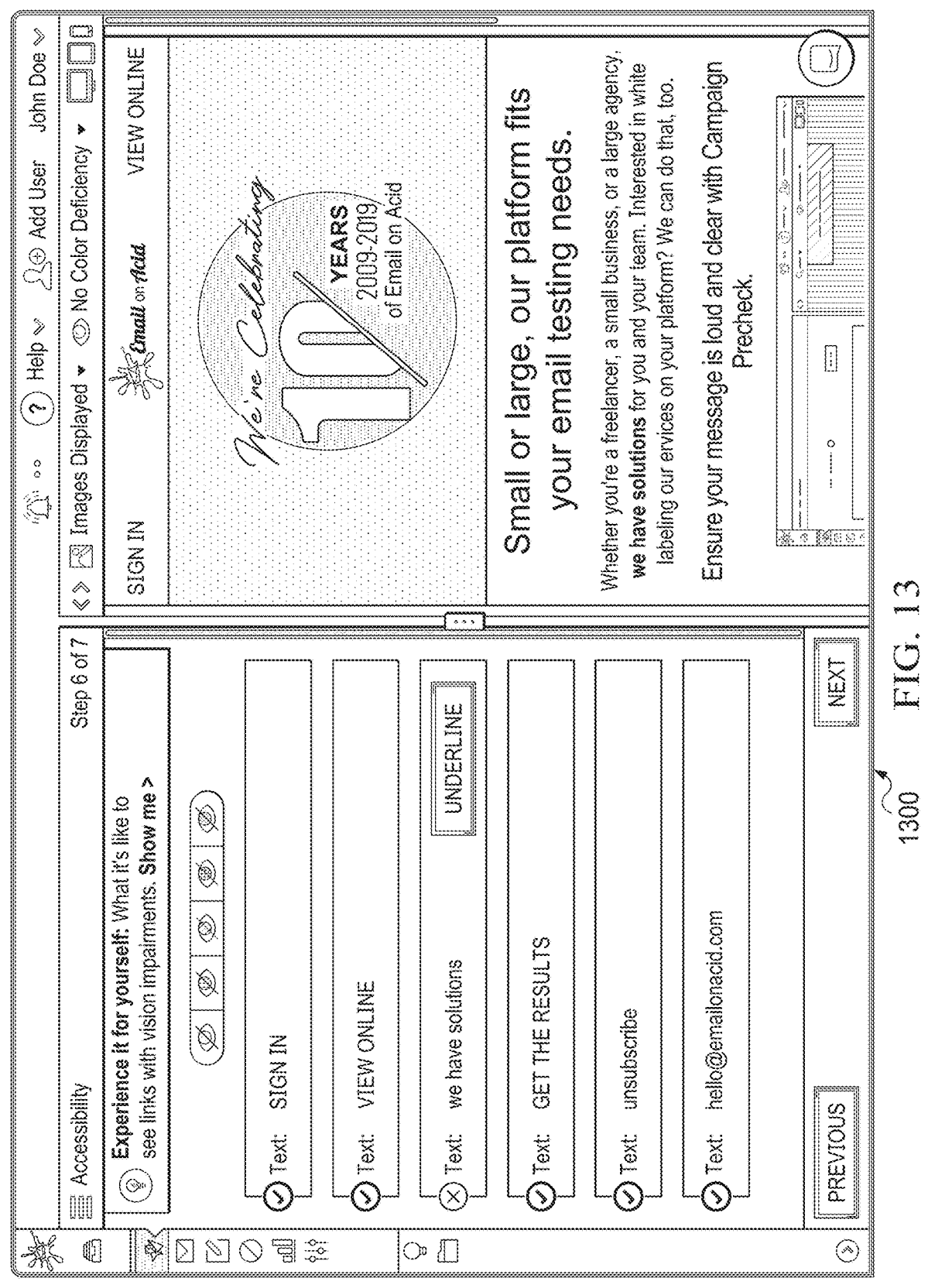
Figure 14:
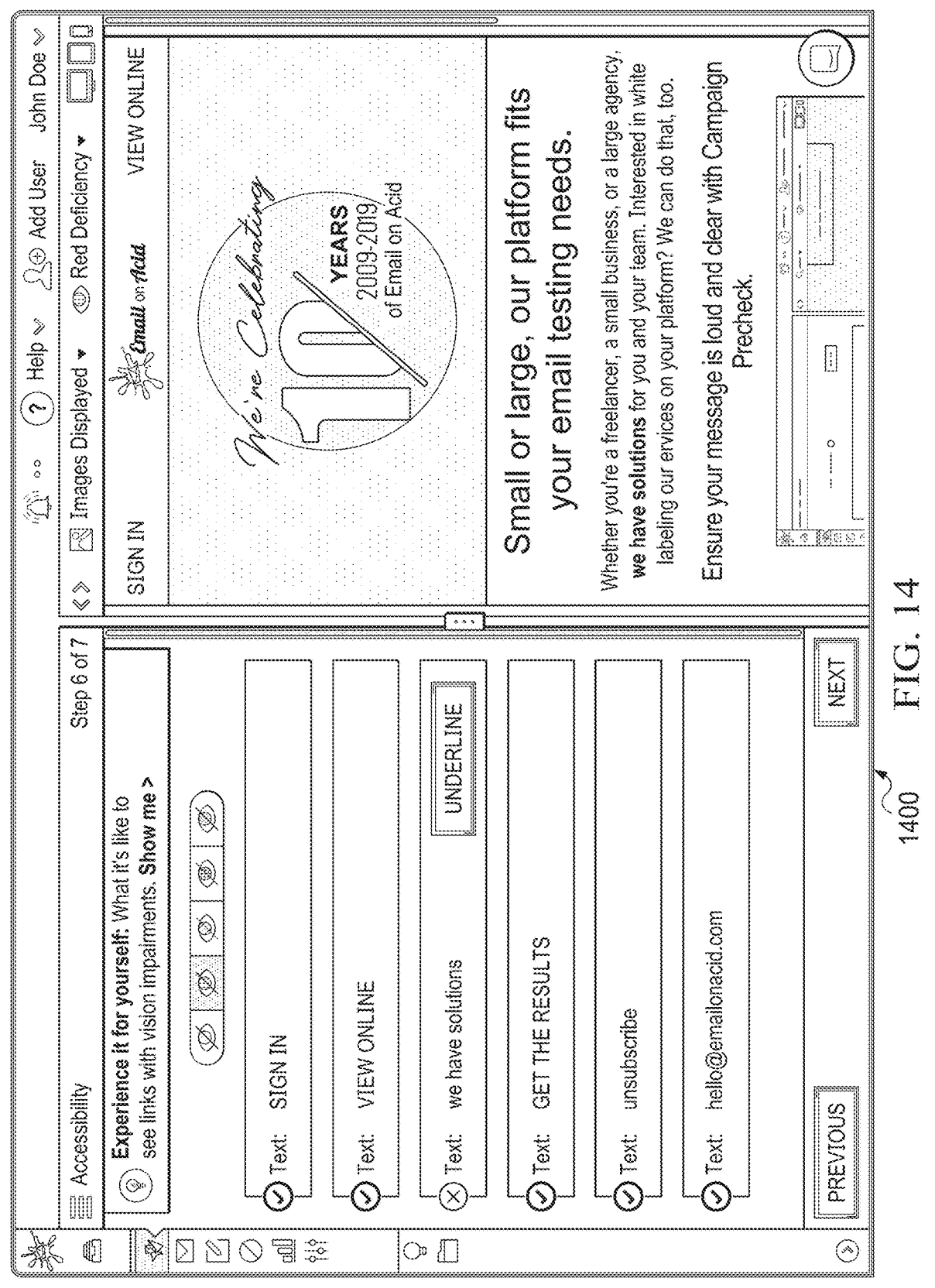

FIGS. 11-14 show an additional screens 1100, 1200, 1300, and 1400 of the accessibility workflow that test links and vision impairment issues. In FIG. 11, the color selection menu 1110 allows the user to select a color to omit, and the rendering window displays what the e-mail would look like to a person who is color-blind to that particular color. Color blindness for red, green, or blue is quite common, as is the inability to see any color, so this feature allows marketers to make sure that the graphics, text, and links come through for every reader. FIGS. 13 and 14 show a difference between no color deficiency selected and a color deficiency selected. Turning back to FIG. 11, often, hyperlinks are different colors than surrounding text, and the fact that some readers may not be able to see hyperlinks simply because they are a different color can be easily overlooked by testers. The link preview display screen shows uses the differences between how visually impaired and non-visually impaired people can see the same links. This feature is especially advantageous because hyperlinks are often the most important part of an e-mail, given that they typically drive traffic to a site or a place to make a purchase.

Figure 15:
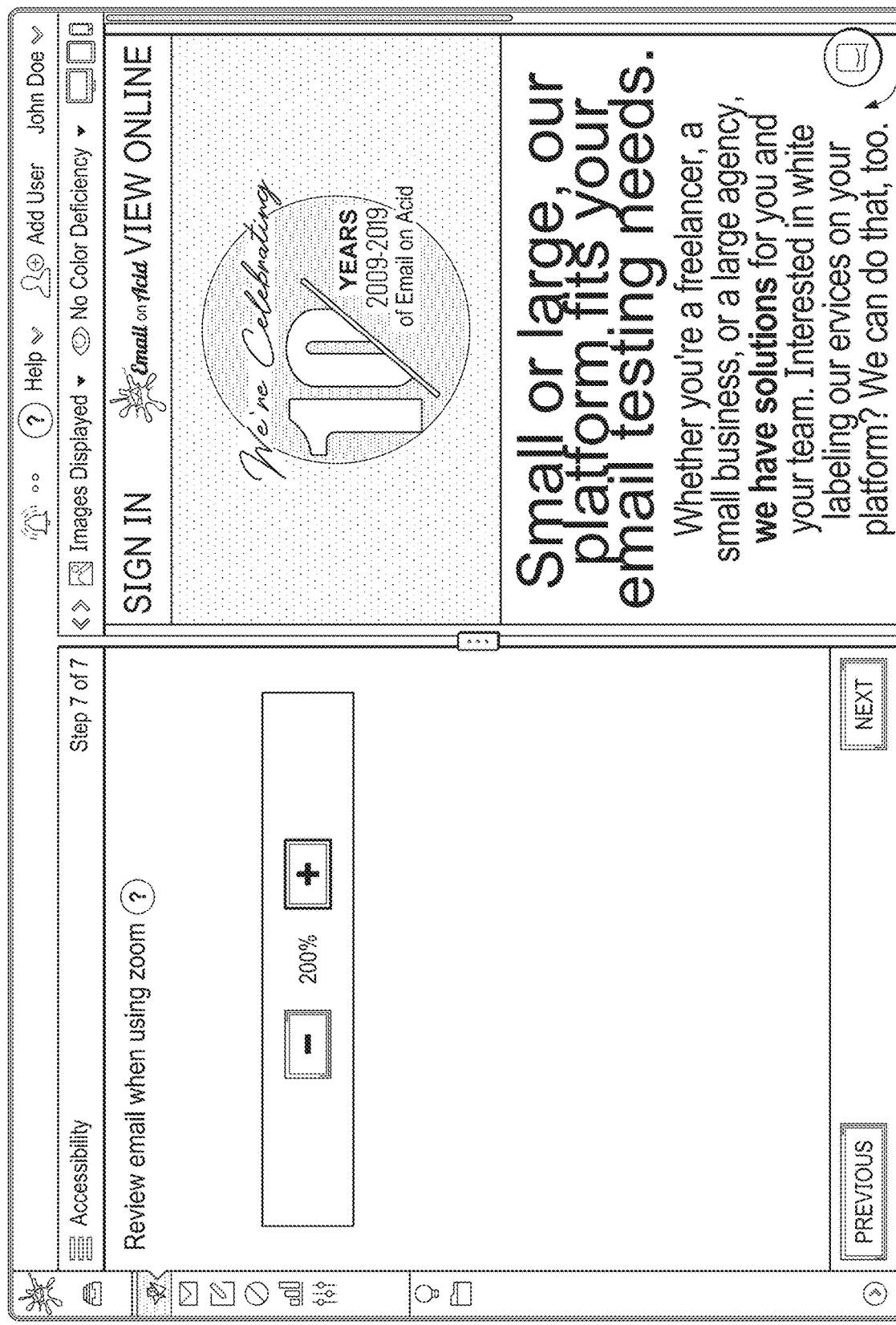
FIG. 15 shows an exemplary interface of the e-mail pre-deployment platform showing a step of the accessibility workflow related to zooming.

Another feature of the accessibility workflow is shown in FIG. 15, on another screen 1500, which allows a user to preview the use of a zoom feature within an email client. As shown in the rendering pane 1510, the use of a zoom feature can make text overlap and have an unsatisfactory appearance. The platform may provide a user interface tool to correct this deficiency by resizing or re-spacing the text content.

In embodiments of the accessibility workflow, it is contemplated that a user may promote and share with others through social media platforms that they developed an email that is accessible. Many websites and e-mails remain inaccessible to users with visual impairments, despite accessibility legislation, so such a feature may encourage marketers, developers, and recipients themselves to implement practices that make the internet accessible for everyone.

In other embodiments, an "advanced view" screen of the accessibility workflow may be implemented to show all the issues that are found within an e-mail. This screen may allow users to skip having to go through each of the accessibility processes one by one, and instead, show all the issues on one screen. The dark rendering window (shown previously in FIG. 3 as the source code showcase 310) shows the background HTML code that is used to display the email in web browsers or email clients. This is important for email developers to review to ensure the system of the present disclosure is not making any unnecessary changes to the code that could potentially cause rendering issues in email clients. As described previously, the rendering window changes dynamically as a user makes edits in the testing and edit window. The source code showcase may change dynamically as well. It is contemplated that the accessibility workflow may have more or fewer tests and steps in other embodiments.

Figure 16:
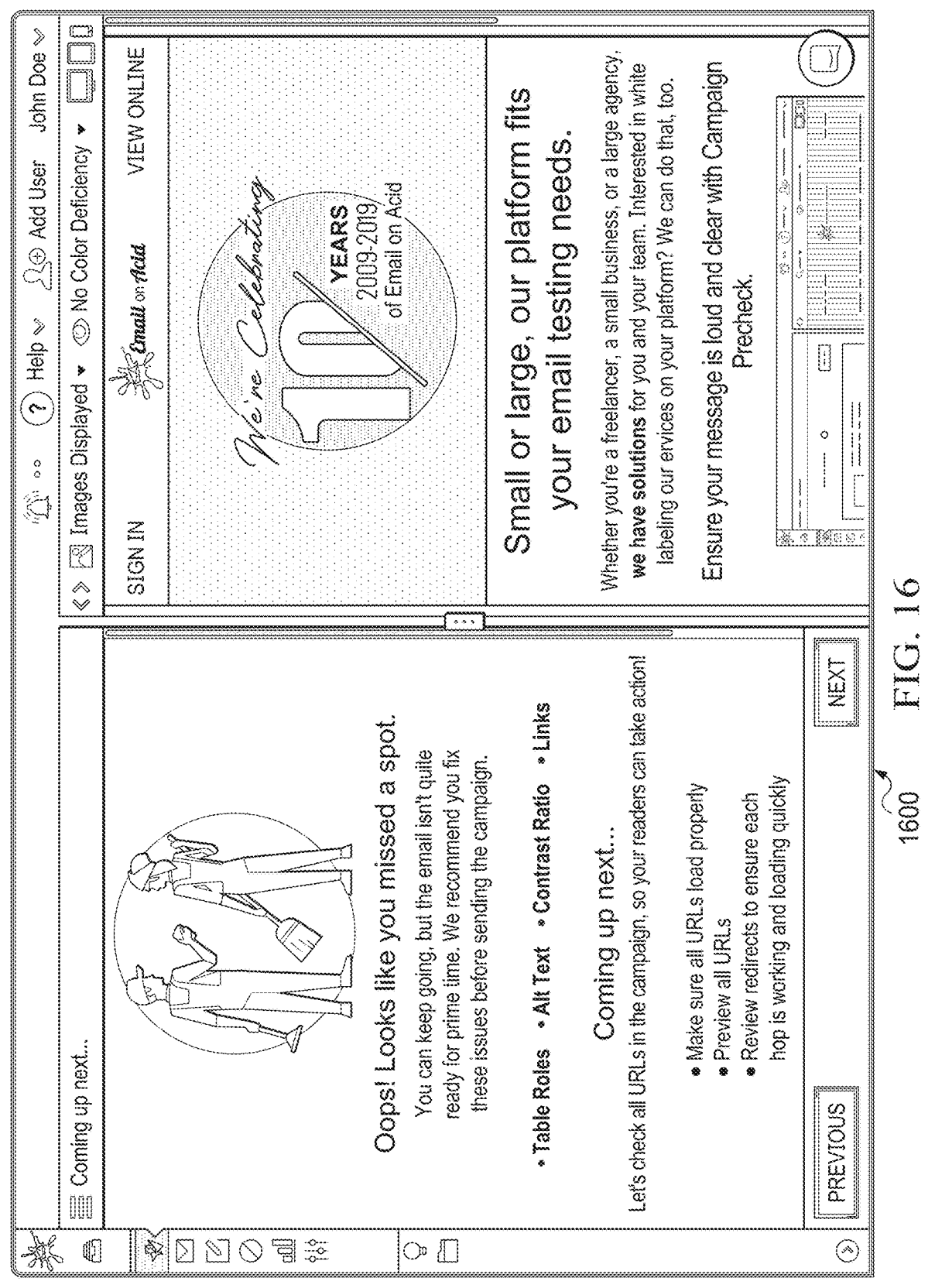

FIG. 16 shows the beginning of another workflow process for URL validation on a workflow preview screen 1600. As previously described, URL links are among the most important contents of an e-mail. There are several reasons why a URL within an e-mail may fail to work or cause other problems. Some e-mail service providers blacklist certain domains because they are indicative of spam. Regular, non-mobile-specific URLs may not render correctly on mobile devices, or conversely, mobile-specific URLs may not render correctly on desktop devices. As shown in FIG. 16, the system indicates that this workflow will test each of the URLs across devices and highlight each of the ones that may be problematic.

Figure 17:
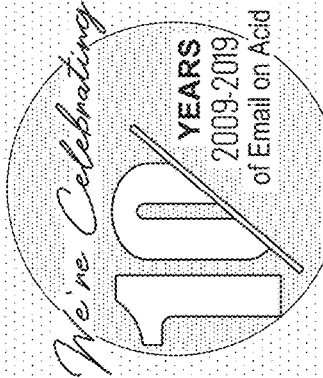
FIG. 17 shows an exemplary interface of the e-mail pre-deployment platform showing the URL validation workflow related to uploading a spreadsheet.

FIG. 17 shows another feature of the URL validation page on another screen 1700, in which a user may upload a spreadsheet of email URLs and their respective destinations to allow the system to automatically compare the links within the email to those in the spreadsheet. This feature allows a user to save an enormous amount of time. Often, creative agencies will receive spreadsheets of links and destinations from their clients that are supposed to be included in e-mails, along with the corresponding titles that go along with each link. It is possible that one e-mail may have dozens of links, some associated with images and some associated with in-line text. These links may all go to different URLs. The system of the present disclosure takes the uploaded spreadsheet and runs a number of checks to determine whether there are more or fewer actual links than indicated in the spreadsheet, and whether each of the links works. Without this feature, users would have to manually check each link, which is a very time-consuming process. The system of the present disclosure can automatically fix and change certain errors found within the email in comparison to checking the spreadsheet.

The URL validation workflow may include features for automatically checking for and resolving several types of URL deficiencies. One such feature may be referred to as UTM Tracking. UTM (Urchin tracking module) code helps a web analytics tool track a particular visitor. These codes help calculate the impact of the marketing content and are extremely important for marketing agencies. These codes may be added to the end of the URL and are used to track performance of each link and the campaign it relates to. As part of the URL validation workflow, may provide the users with an opportunity to add UTM codes to their URLs. Such a feature may include automatically detecting any UTM codes already present in the URLs in an email and providing the user with the list of URLs in which a UTM code is missing.

Another URL validation feature in embodiments of the disclosure is automatically changing "HTTP" (unsecure) links to "HTTPS" (secure) if the reference URL does indeed have a security certificate. If the URL is a HTTP reference, the platform may automatically check if the same URL will resolve to the same address with the HTTPS prefix. Using all HTTPS links, when possible, may improve security and potentially inbox placement.

Yet another feature in embodiments of the URL validation workflow may include sample testing and display of dynamic links or merge tags. Dynamic links may be different links that are sent to different people within a campaign based on data particular to the recipients—for example, links for women's clothing may be sent to recipients identified in the company's data as female, and links for men's clothing may be sent to recipients identified in the company's data as male, even within the same email campaign. Merge tags are features that may be used to personalize each e-mail, such as putting a recipient's actual first name in a "first name" field. In embodiments of the disclosure, the URL validation workflow may include providing samples of dynamic content for real data, which may provide a method for users to test dynamic content while doing quality assurance on their campaigns. Users can provide a sample of data and the platform may validate that the campaign reacts as it is intended and show a sample of previews to the user for their comfort. Embodiments may not show every combination of dynamic content (which could number in the thousands or millions) but may show a large enough sampling to catch common errors.

In embodiments of the URL validation workflow, the user may change or edit particular URLs, then click on the preview button, and in the right viewing pane the system will load the URL's HTML so the user can preview the destination page to ensure the link is going to the proper destination. The system, in embodiments, may open a new tab with a particular URL used in order to "logic check" and self-validate in addition to providing verification via the viewing pane. If the URL is not correct, the system may present the user with a prompt to correct the URL, and the system will incorporate it into the HTML itself.

Figure 18:
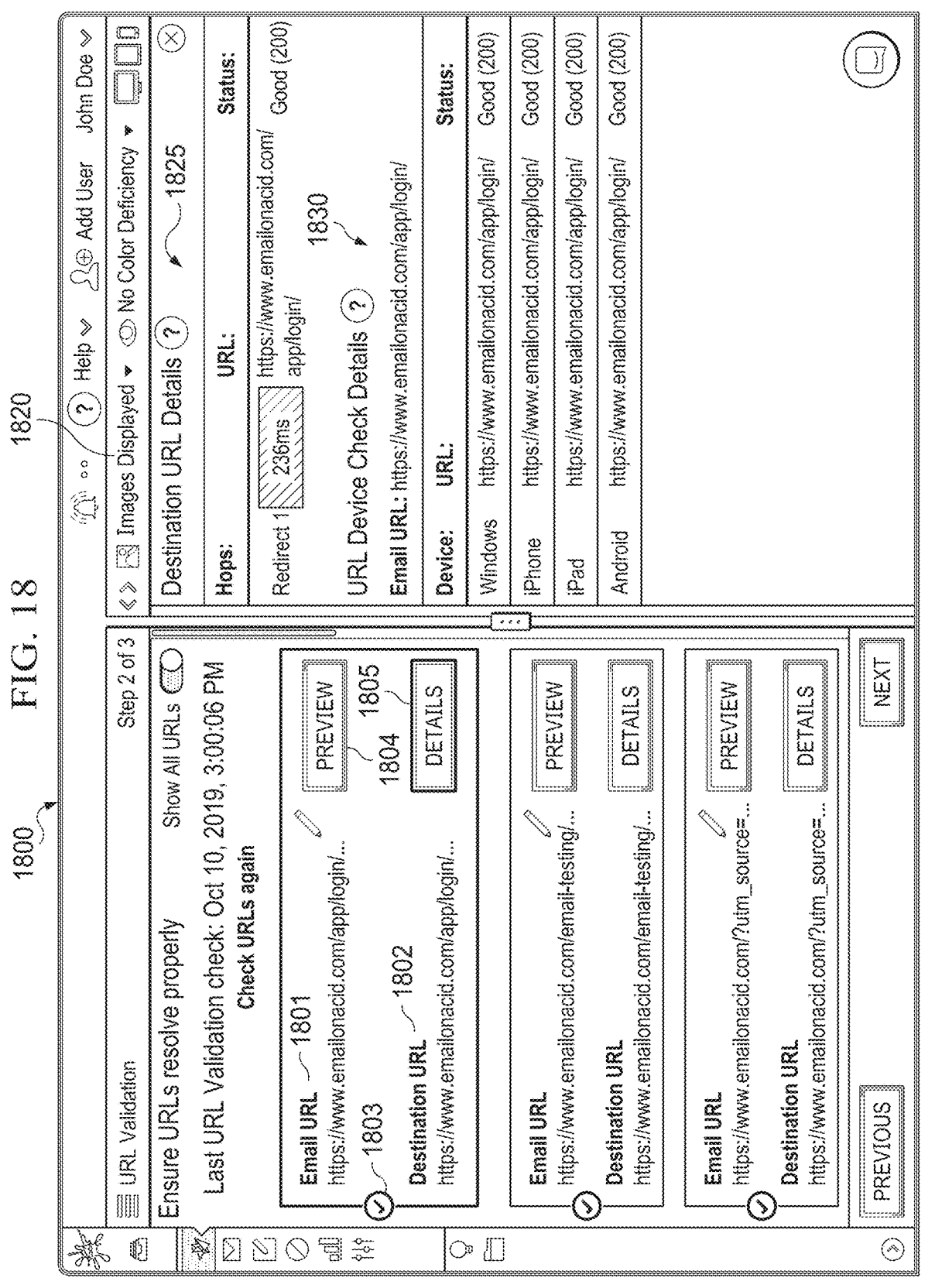

FIG. 18 shows additional features of the URL validation process in a URL validation screen 1800. In the URL validation screen 1800, the user can see the listed URL 1801 as hyperlinked with the actual email and can see that the destination URL 1802 in fact does resolve to a valid URL. As shown the URL validation screen 1800 may have several buttons and/or features to assist the user in ensuring the URL validation, such as a checkmark 1805, a preview button 1804 (to show a preview as previously described) and a details button 1805 to allow a user to visually inspect the destination URL. In embodiments, this details button 1805 may prompt a "destination URL details" preview window 1820 to appear in the preview pane.

Another feature, shown in the destination URL details preview window 1820 allows a user to review the "redirect hops" that occur when a user clicks on a link. With some embedded links and URLs, a user's browser is actually redirected to several URLs before landing on the destination page. This function is known as tracking URLs. These URLs may include ones for analytics tracking, different domain names, advertising links, and mobile or non-mobile versions. If any of these links are broken, a recipient may not end up on the intended site. Multiple redirect hops may also cause page loading to be slow, which may cause recipients to give up on the site. The redirect hops feature 1825 allows users to review the redirect URLs, preview the load times, and help detect any problems. This preview window 1820 may also include a feature for checking errors in URLs loading across various types of mobile devices and operating systems, as shown in the URL Device Check Details 1830.

Another feature of the URL Validation workflow may include validating Google®'s "UTM (Urchin Traffic Monitor) parameters" that can be added to the end of any URL to track clicks and performance of marketing activities within Google®'s Analytics application, which is shown in a campaign parameters screen 1900. "UTM parameters" may refer to the "source," "medium," and "name" for URLs within a campaign. A campaign "source" may refer to the referral traffic source of the URLs, the "medium" may refer to the marketing channel or campaign type, and the "name" may refer to a product, promo code, or slogan associated with the URL. These parameters can be assigned to each of the URLs in order to categorize them and measure their performance after the subscriber clicks on a link in the email. If the parameters are not associated with the URLs in a consistent manner, it may difficult to perform analytics tracking of what the subscriber did once they landed on the URL destination. Alternatively, the analytics could be tracked against a different campaign, which may lead to inaccurate reporting of a campaign's performance. Therefore, the system of the present disclosure allows a user to rectify such parameter issues through user interface tools for the campaign source 1910, the campaign medium 1920, and the campaign name 1930. The use of these user interface tools will automatically edit the underlying HTML to associate the desired parameters.

Figure 20:
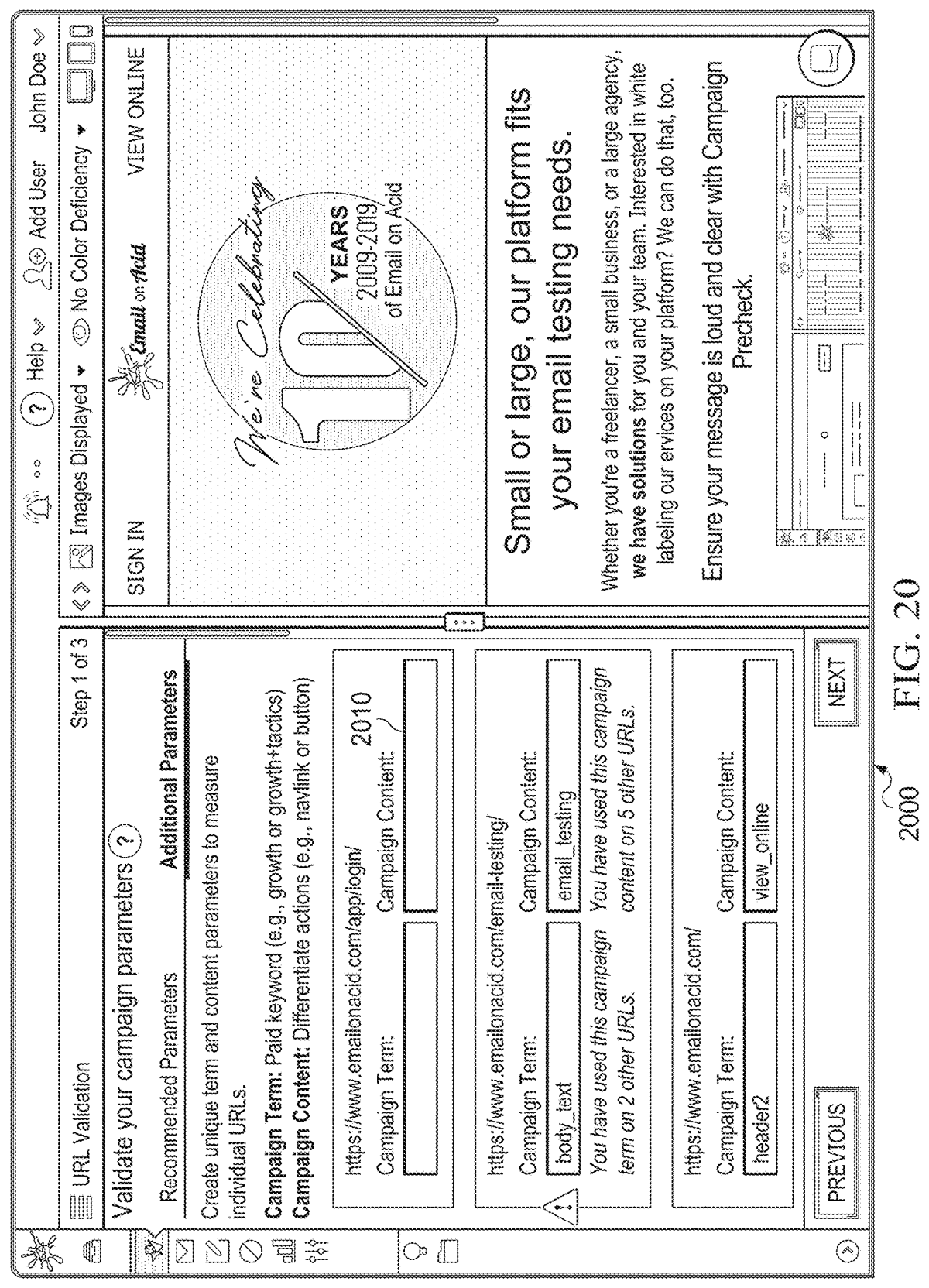

FIG. 20 shows an additional parameters screen 2000 in which a user can create unique terms and content parameters to measure individual URLs. As shown, a user can associate both a "campaign term" and "campaign content" with each URL via an additional parameter input field 2010. A "campaign term" parameter may refer to a paid keyword to be used with a URL, and a "campaign content" parameter may be used to associate differentiated user actions (such as clicking on a button as opposed to a navigation link) with the URL. One feature of this additional parameters screen 2000 is that it may notify a user how often a particular term or content has been used with other URLs.

Figure 21:
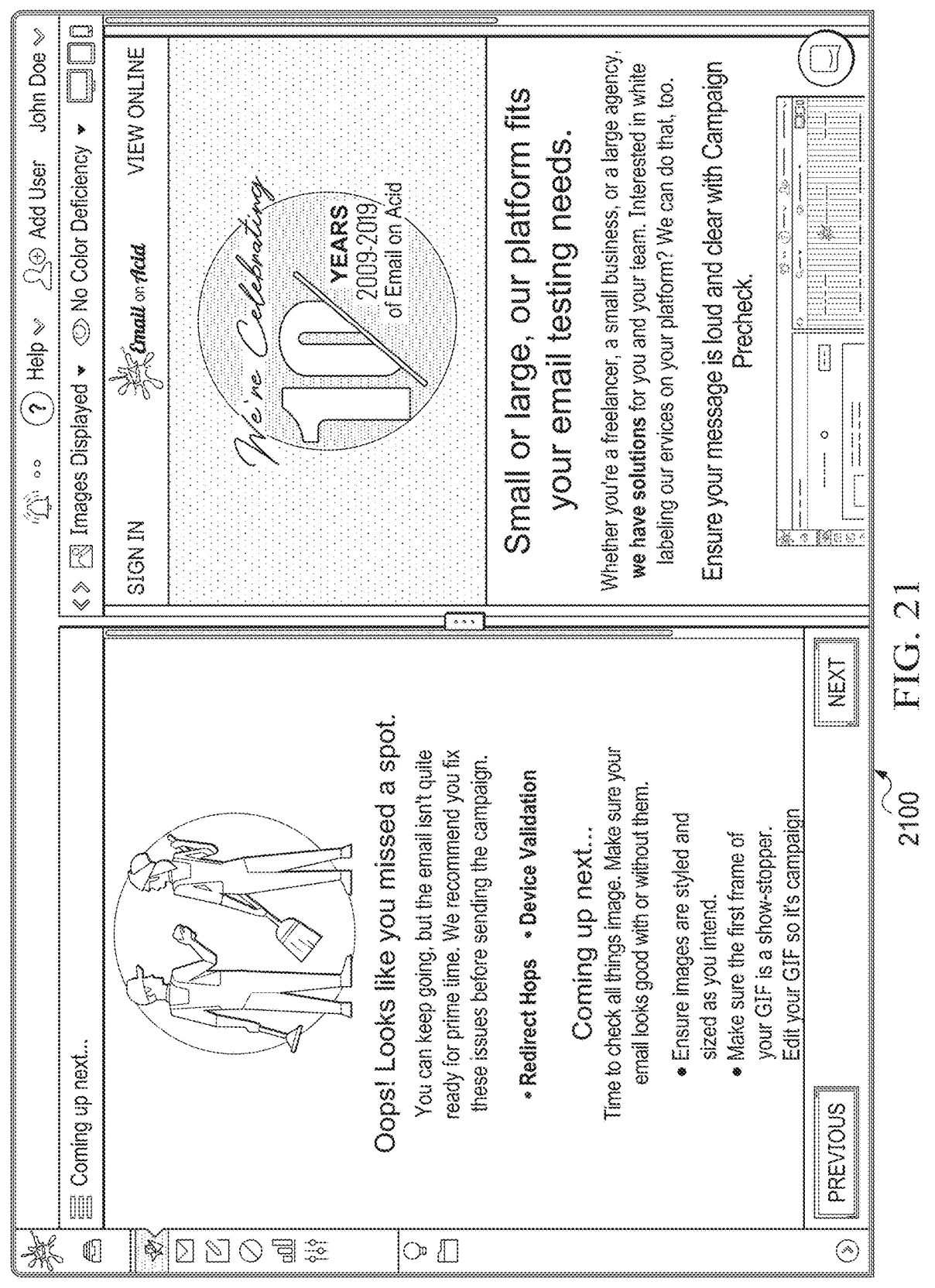
Figure 22:
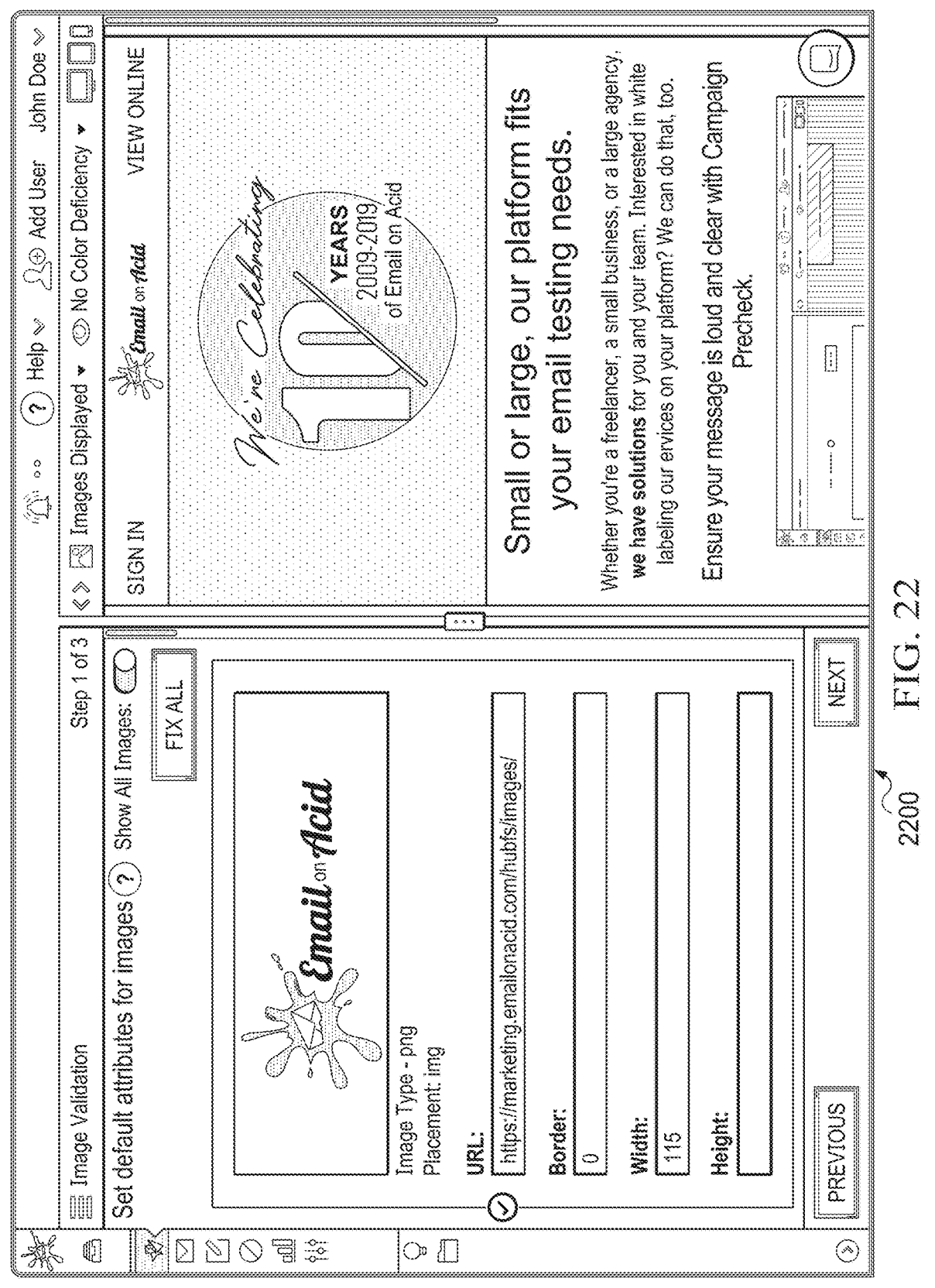

Another aspect of the system is a process for image validation. An introductory screen 2100 for the Image Validation workflow is shown in FIG. 21 The Image Validation workflow may comprise four steps: 1) Image Styling, 2) Alt Text and Styling, 3) Optimization of Image Size/Weight and a Download Map, and 4) GIF Frame Setting, which will be described presently. In embodiments, more or fewer of these Image Validation steps may occur. The first step of Image Styling is depicted in FIG. 22, which shows an image styling screen 2200 in which each of the images within the e-mail are displayed along with relevant attributes. For example, each image is shown with its file type, its size, and its border, width, and height attributes. Any problems are highlighted, as in other workflow processes.

An aspect of the Image Validation workflow may include Alt Text and Styling. This feature may include an input field which allows for the addition of alt-text, as well as stylization of it (e.g., bold, italics, and font stylization) in a WYSIWYG (what-you-see-is-what-you-get) type editor. This is an additional way for alt-text to be added separate from the Accessibility workflow. This alt-text may be stylized because it is intended not only to be used by screen-readers for the visually impaired, but also when images have not been downloaded and only a text description appears in the place of the image. A feature of this step in the workflow is that a user may toggle images on and off in the viewing pane to see what the email will look like to a reader if the images do not download. Through this feature, email marketers may still utilize the blank space left by the failure of an image to download by having some text appear that is still of value to the reader.

Figure 23:
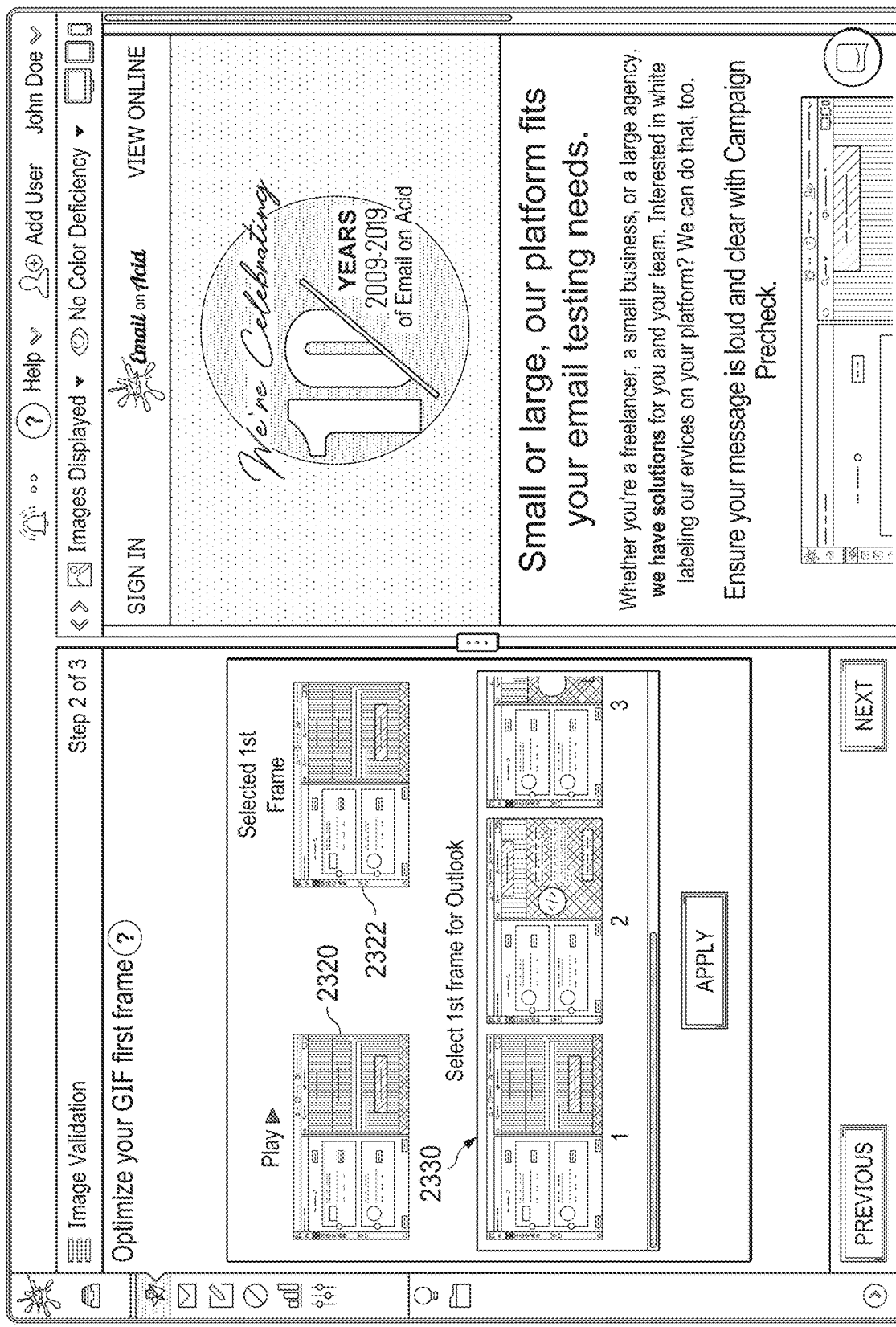
FIG. 23 shows an exemplary interface of the e-mail pre-deployment platform showing a step of the image validation workflow related to GIF file frame selection.

Another step of the Image Validation workflow is GIF Frame Setting, shown in FIG. 23 on another screen 2300. The images 2320 depicted on the right are a .gif file, which is a short, repeating, multi-frame animation, and its default first frame 2322. Certain e-mail providers, such a Microsoft Outlook, do not support .gif files playing in the body of the e-mail. Instead, it shows just the first frame of the .gif file. This can be undesirable if the first frame is blank or is not representative of the image's primary call to action or is generally not a good representation of the images. The system of the present disclosure splits up the .gif file into its individual frames. The GIF image selection screen 2330 shown allows a user to select which frame they want as the first frame and rebuild the .gif file with that selection as the first frame. The animated gif will then have the appropriate frame as the first frame, which will be shown in Outlook to maximize its appeal and effect to the recipient. Like the image size optimization feature, the update GIF frame setting feature may be automatically updated in the preview pane.

Figure 24:
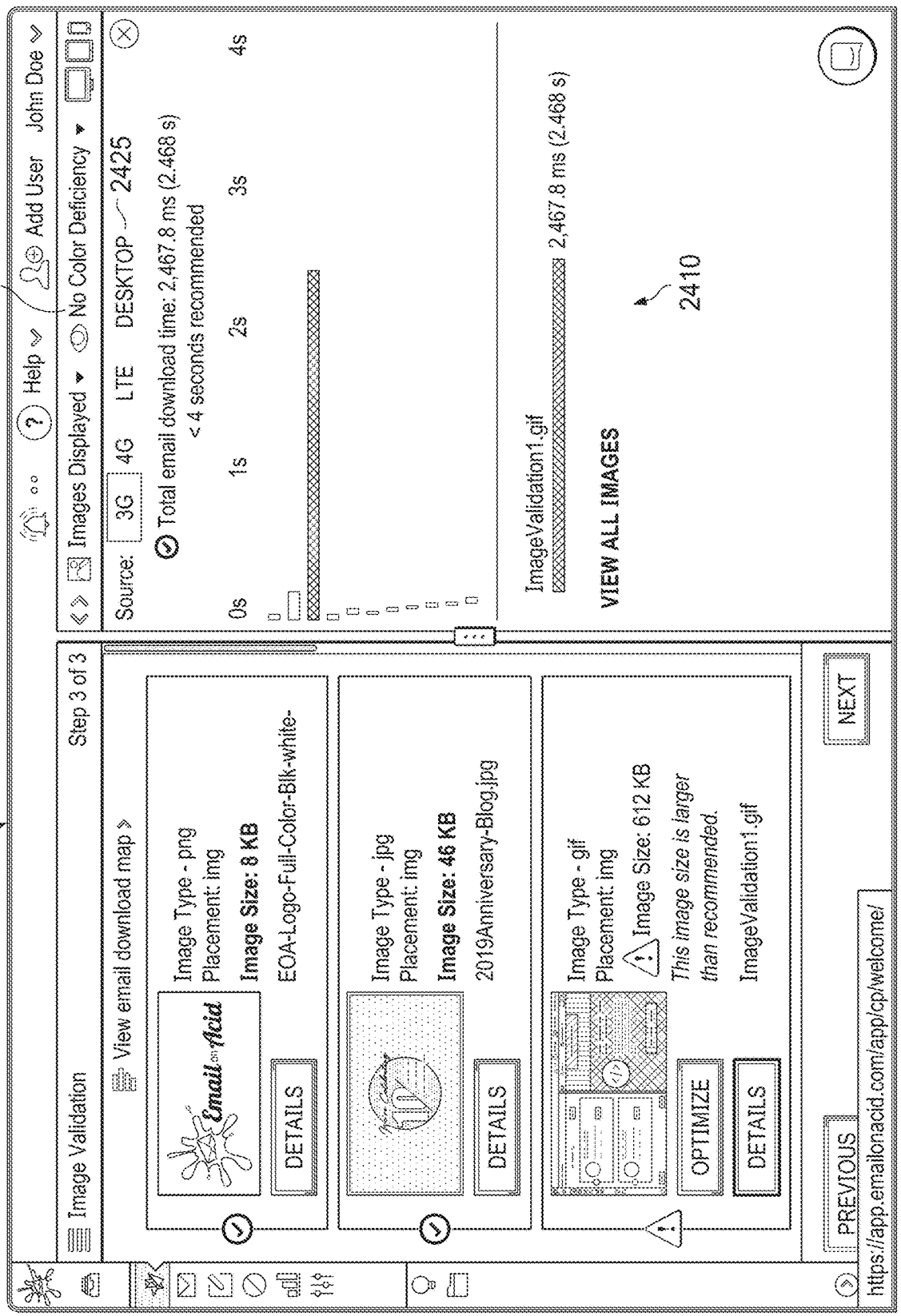
FIG. 24 shows an exemplary interface of the e-mail pre-deployment platform showing a step of the image validation workflow related to image placement and load times.

Another possible step of the Image Validation process, which comprises the Optimization step, estimates image download times across networks. A screen 2400 implementing this step is shown in FIG. 24; a download time map 2420 is provided in the viewing pane 2410. It may be a problem if an image file size is so big that it is estimated to require very long download times. The map allows the user to see the differences between downloads on 3G, 4G, or desktop connections, and displays a total download time via the device menu 2425. Marketers know that recipients have limited patience for long download times, so they may use this information to adjust properties of the images or to choose to omit certain images to maximize the download efficiency. In such instances, the system may automatically fix this problem by compressing the image file. The user may be presented with a tool, such as a button, and with just one click, the user will have prompted the system to edit the HTML code to compress the image. In the dynamic rendering window, the new optimized image will appear automatically.

Yet another workflow process for may be provided by the platform of the disclosure and may be referred to as "content validation". A content validation workflow may check characters and text for various formatting issues. Sometimes, copying and pasting text and characters from one program to another creates formatting issues, so this process checks for any corrects those. This workflow process may also include checking the content "size"—that is, the size in bytes—to ensure their proper formatting within various the email clients and that the entire message is displayed correctly.

Figure 25:
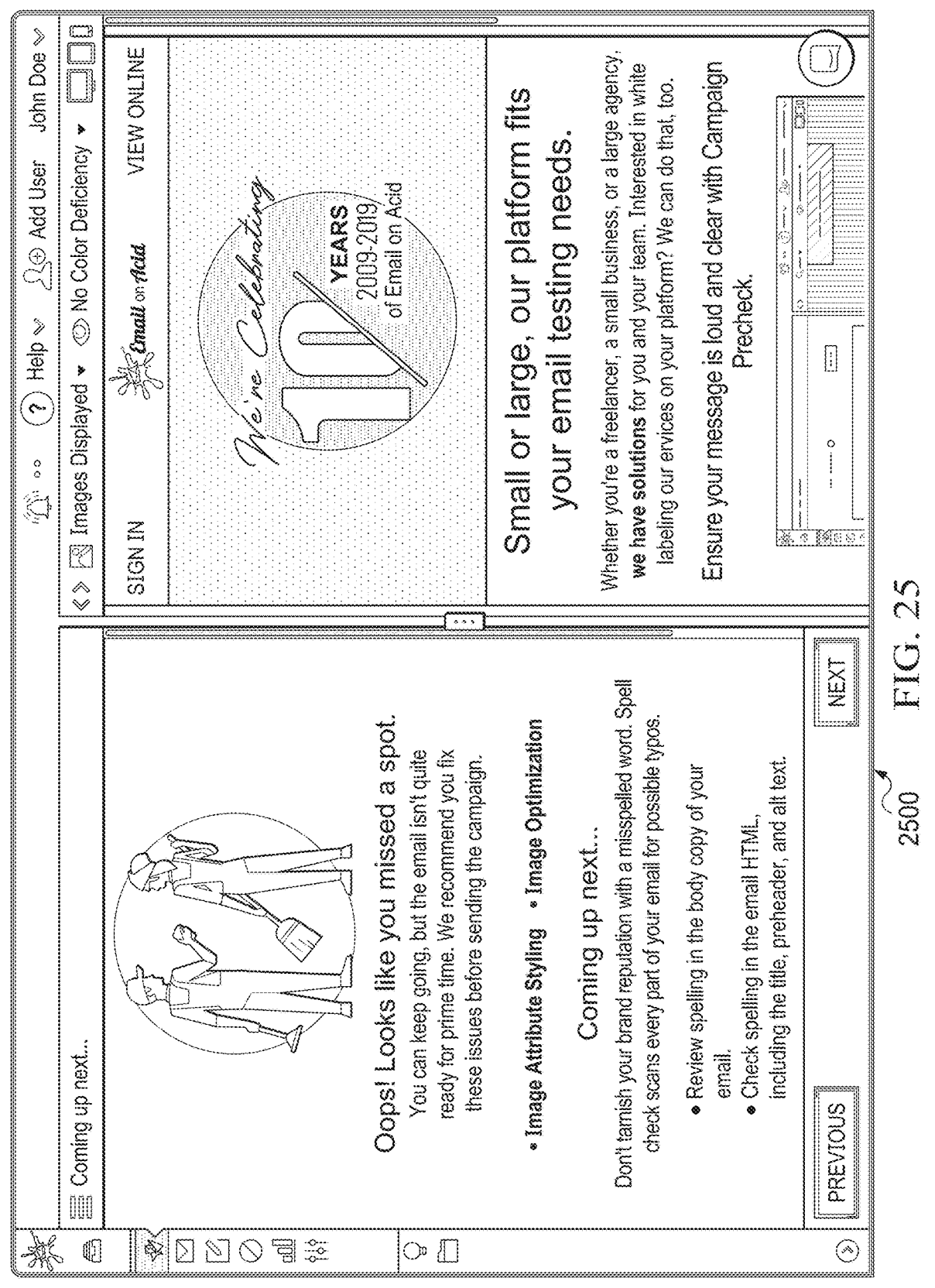
Figure 26:
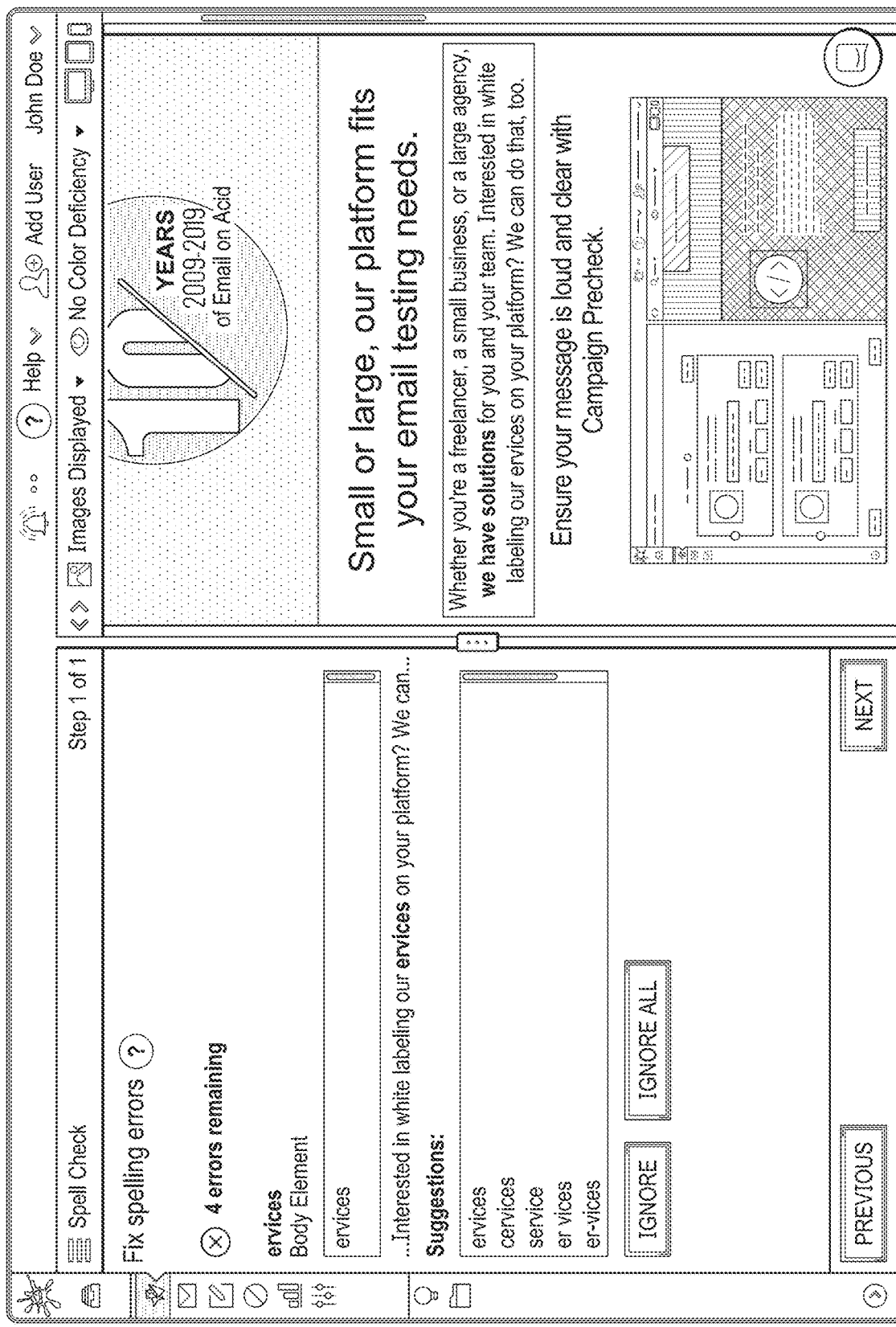
FIG. 26 shows an exemplary interface of the e-mail pre-deployment platform showing a step of the content validation workflow related to spell-checking.

FIG. 25 shows a spellcheck workflow preview screen 2500 and FIG. 26 shows a spellcheck workflow process screen 2600. Though many other programs incorporate spell-check features, a unique aspect of the present system is that it not only checks displayed text content, but also spell-checks HTML itself and alt-text. The spell check section reviews all text within the HTML for spelling errors (which ultimately gets displayed to e-mail recipients) and checks for misspellings of HTML code itself, such as misspelled HTML tags or functions. In addition to reviewing content visible in the body of the HTML, the platform also checks alt text, title text, and preheader text for accuracy. Without this feature, those areas would need to be manually reviewed in a code version of the HTML. This feature allows users to catch mistakes that are hard difficult to catch with purely manual reviews.

Additionally, this step in the platform provides recommendations and the ability for a user to edit the HTML either through an editing pane input field or directly in the source code showcase.

Yet another aspect of the disclosure provides for an analytics workflow process. The platform of the present disclosure may be used primarily to test and render e-mails before a user sends them out through another e-mail sending service. These sending services often include analytic measurements of "opens" and "clicks". An analytics screen shown may collect information that may be integrated with the analytics services provided by the e-mail sending service and add more potential metrics. For example, the present system may include settings for engagement tracking. An input field such as an engagement tracking box may allow a user to see and set particular time zones to track and set a number of seconds to track thresholds for each of "read," "skim," and "delete". An input field such as a click tracking box allows a user to select whether to track click events and whether to use Google Analytics®. An input field such as a benchmarking box may allow a user to enter a subject line to track metrics related to that subject line in the future. With this feature, the user may track the campaign to measure whether it meets expected benchmarks for open rates and click rates. The benchmarking tool allows email marketers to keep different email metrics organized by measuring success rates certain emails against others. It is contemplated that certain campaigns may be set as benchmarks, but not others, and those others will be measured against the benchmarks.

Figure 27:
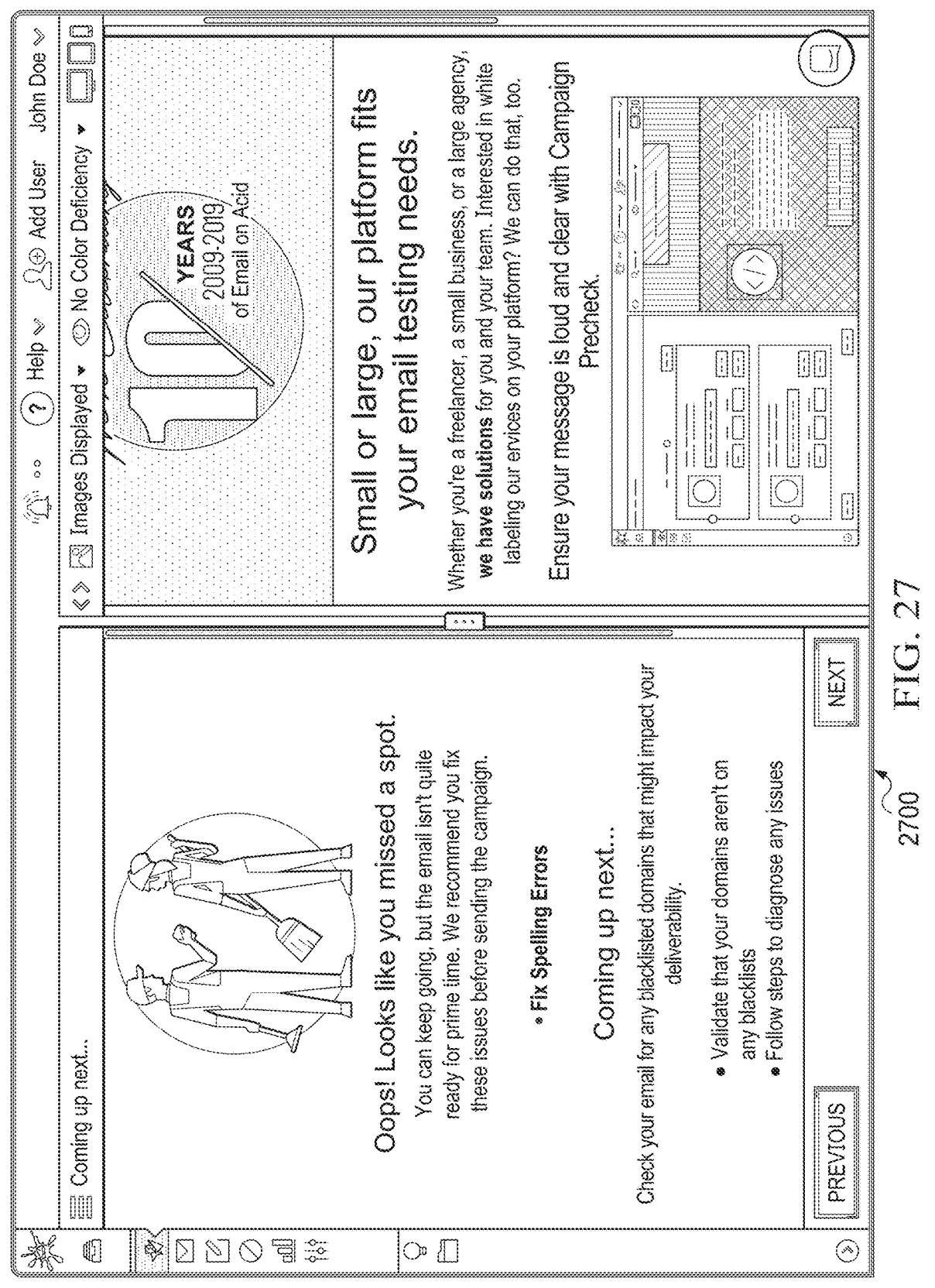

FIG. 27 shows an introduction to a deliverability workflow process screen 2700 which may include checking for blacklisted domains and for whether the e-mail might be labeled as spam. "Blacklisted" domains are domains that certain e-mail service providers may have specifically blocked due to previous problems of because they meet some predefined criteria for being placed on the blacklist. Having blacklisted domains in the content of an email can hinder its ability to reach a subscriber's inbox. In this step, as shown on the blacklist results page 2820 on the blacklist workflow screen 2800, the platform may check every URL in an email across the known blacklists of several popular email vendors to give the user a comprehensive view on whether any of them are blacklisted. Ensuring that the links in the e-mail are "clean" (i.e., not on a blacklist) improves user experience and keeps emails both going to the inbox and avoiding the spam folder.

Figure 29:
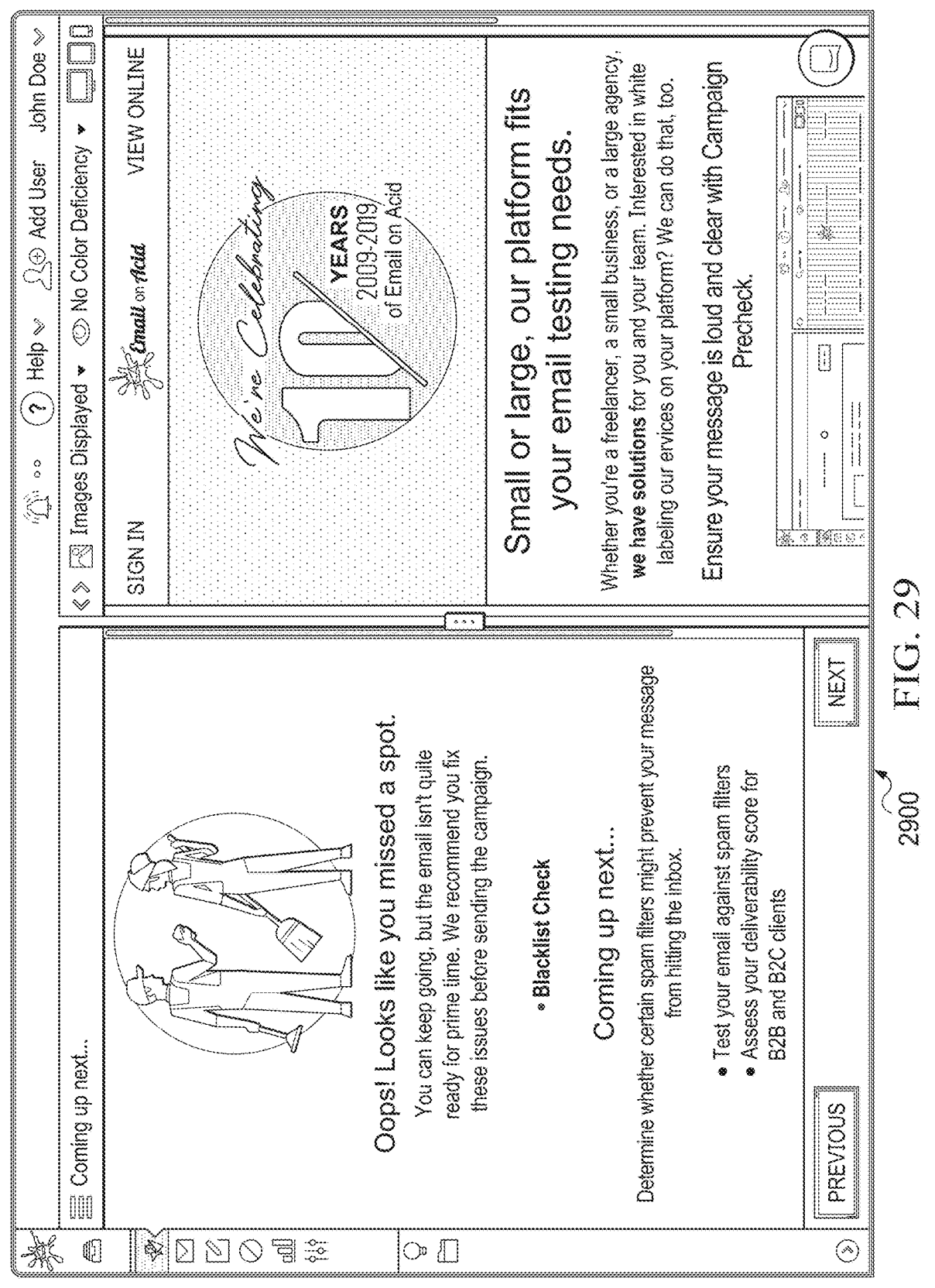
Figure 30:
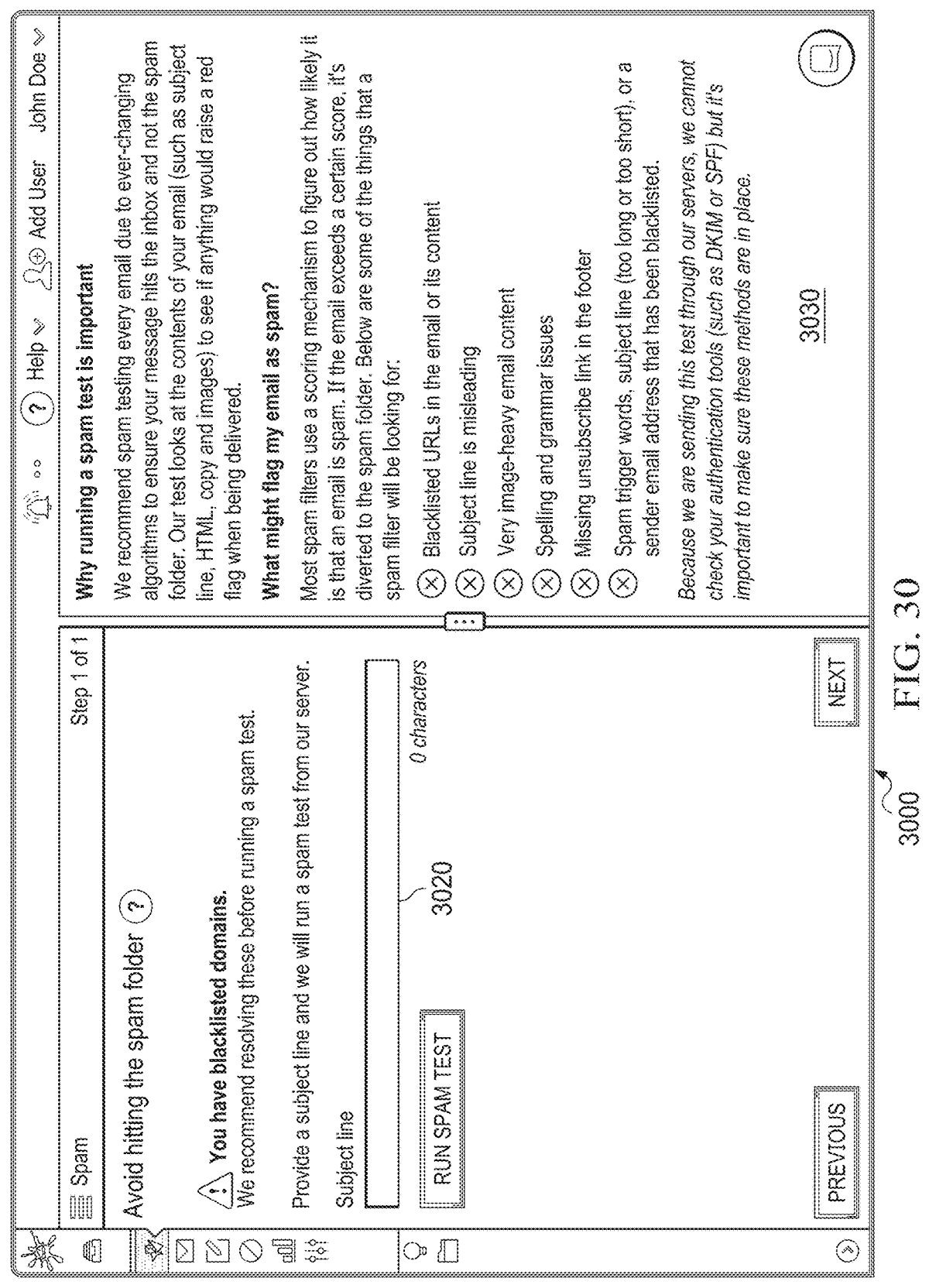

FIG. 29 shows a deliverability workflow preview screen 2900 which specifically previews deficiencies to be rendered related to spam. The spam check portion of the deliverability workflow runs test e-mail subject lines against the actual e-mail addresses in the send list. The system of the disclosure may comprise a database of e-mail service provider and server rules that are previously known to the system. It is known that the spam filters of various e-mail service providers utilize algorithms with various rules to block certain e-mail subject lines. These algorithms may be based on certain words or phrases within a subject line. FIG. 30 shows a screen 3000 of the spam check process and a spam check results window 3030 which displays the results of the spam check on many or all known public e-mail address service providers. In embodiments, a screen may show a list of business-to-business e-mail domains and shows whether or not the e-mail passed the spam check on each of them. It may also show a column of business-to-consumer e-mail domains and whether or not the e-mail failed the spam check on any of them. For ease of use, this screen may also, in embodiments, show circle graphs or other visual indicators which indicate the percentage of each type of e-mail domain (i.e., business or consumer) that passed the spam check, as well as a graph that shows the overall pass rate of the e-mails. As shown in the subject line input field 3020, users may change the subject line and click a button to run a test again to see if the changed subject line improves results against the spam check. Marketers may utilize this information to improve the quality of their e-mail subjects in future campaigns.

In embodiments, the system may include several additional features. One such feature may include Mark Up and Collaboration Tools. Such a collaboration tool may allow a user to 'tag' another user in their personal workflow if they needed their attention, help, or input on an error. This feature may be helpful in instances where the user of the tool may not be able to fix every issue on their own and may need the assistance of others.

Other possible features may include dynamic content validation, content localization conversion, which converts the content language from one to another (e.g. English to French or German to English), and grammar checks via APIs to external grammar-checking software. Another feature may include integration to allow Salesforce®'s "ampscript" validation, which is validation of a proprietary scripting language for Salesforce Marketing Cloud products that users can embed within HTML emails, text emails, landing pages, and SMS messages to control the content that is displayed to the individual consumer. In general, the platform may allow numerous types of third party integration for e-mail validation technologies, including, but not limited to, Google's AMP (Accelerated Mobile Pages) for email validation, which is a technology that allows email marketers to embed the interactive elements like carousels, accordions, confirmation, purchase buttons, etc., into the emails without opening a new tab to visit a website, HIPPA (Health Insurance Portability and Accountability Act of 1996) compliance validation, which checks the content to ensure it is formatted correctly to meet the HIPAA Administrative Simplification Regulations, and VML HTML code validation, which checks to ensure any VML code used within the HTML is properly formatted.

Figure 31:
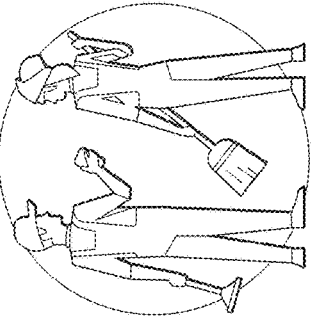
FIG. 31 shows an exemplary interface of the e-mail pre-deployment platform showing a preview screen for a quality assurance workflow.
Figure 32:
FIG. 32 shows an exemplary interface of the e-mail pre-deployment platform showing a step of the quality assurance workflow which summarizes the edits made by the user and the platform.

FIG. 31 shows an introductory screen 3100 for a last Quality Assurance workflow, which may comprise several steps FIG. 32 shows a summary page 3200 that appears at the end of the one or more workflows a user has completed. It works like a report card of the user's progress and denotes if the user has passed each recommended check or has outstanding areas to address throughout the overall workflow. This page also includes a 'download assets' action 3210 to get the new HTML automatically edited within the platform. In embodiments, it may also include a "Share Summary" link and pdf, which allows the user to share the changes made with clients or leadership outside of the tool. As shown, a QA testing list 3220 may show a validation of completion of steps, using designations such as an "x" or a checkmark next to each step. In embodiments, the summary page 3200 may include timestamps of any relevant tests run. This summary page 3200 may function as a 'report card' of sorts to review what was tested and its current status. A user may be able to review the difference from their original HTML code to the new updated HTML code, add title a campaign, download a report card, and download the latest HTML for a user to put in their Email Service Provider or CRM (Customer Relationship Manager) software, among other possible features. The summary page 3200 may be advantageous for showing the value of the improvements made from the first entry of the previously created HTML into the e-mail pre-deployment system to the end product right before sending. Users may be able to quickly understand the scope of HTML edits automatically made to the e-mail in response to the user's use of the interface tools, and understand the time saved by making these edits through the e-mail pre-deployment platform of the present system.

Yet another feature of the present disclosure may comprise a Validation Component. In embodiments, this Validation Component may be present in parts of all the workflows of the system, in which the system denotes whether the HTML either "passes" the validation, has an "error outstanding" (and therefore includes a recommendation to not send until resolved), or a "notification or optimization missing" (under which the user can still send, but will be missing out on perfecting the campaign). Throughout the workflows of the present disclosure, and with each of the tools provided to fix errors, the system provides guidance and advice in various call-outs and other validation features to lower send anxiety. The system may denote green, red, or blue indicators (with symbols) to represent the status of different parts of the HTML, so users can know exactly what HTML changes correspond to fixes implemented by the system.

Embodiments of the disclosure may include a review page of the overall workflow process in which original versions of the e-mails are displayed next to updated versions. The review page shows original versions in HTML preview format (i.e., as a recipient with an HTML-enabled e-mail display would see it), in HTML code, and in text-only (i.e., as a recipient with an HTML-disabled display would see it). This feature allows a user to see all the changes that have been made throughout the workflow, which may reinforce to the user how the workflow has walked the user through fixing many problems.

Figure 34:
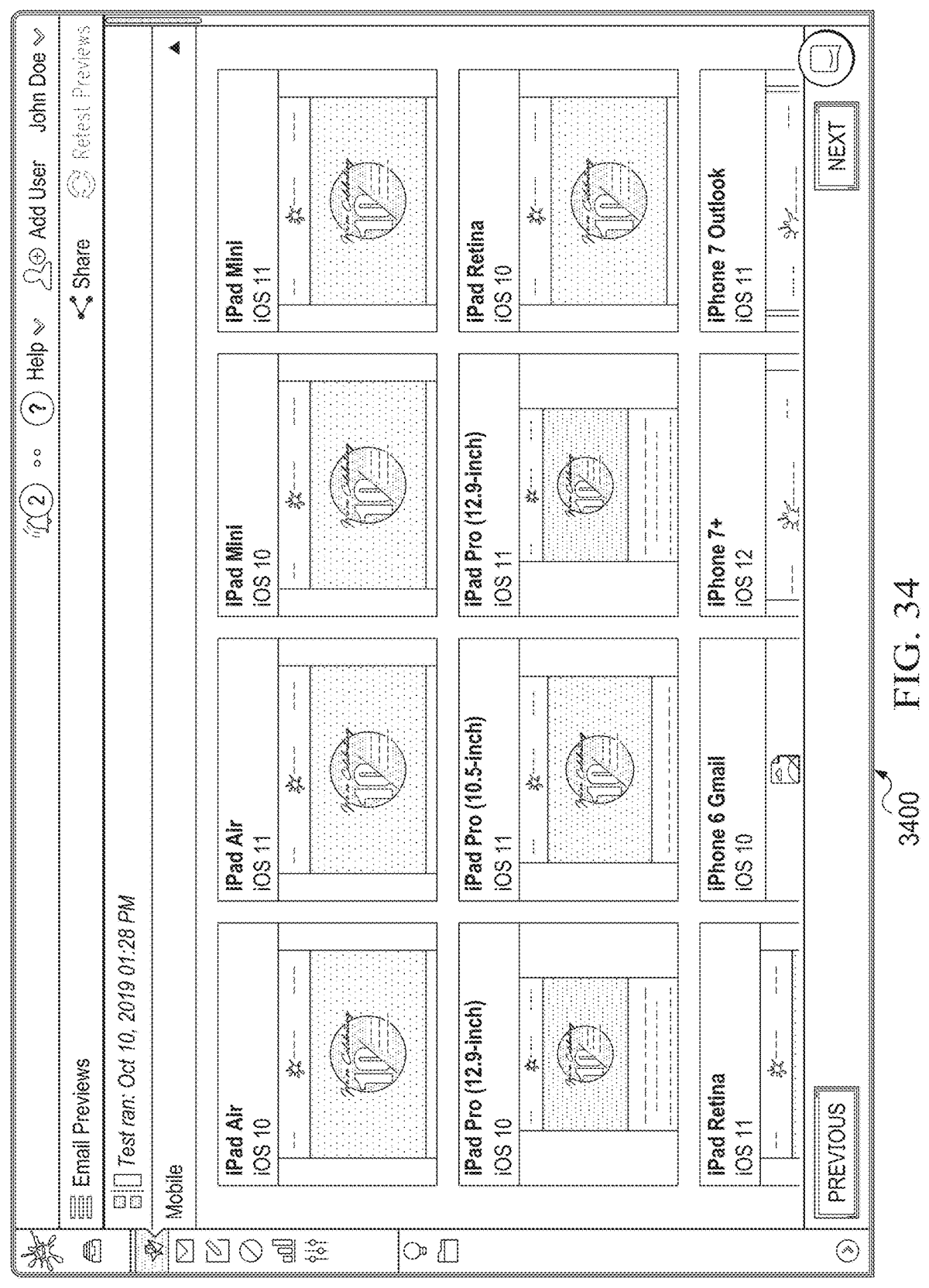
Figure 35:
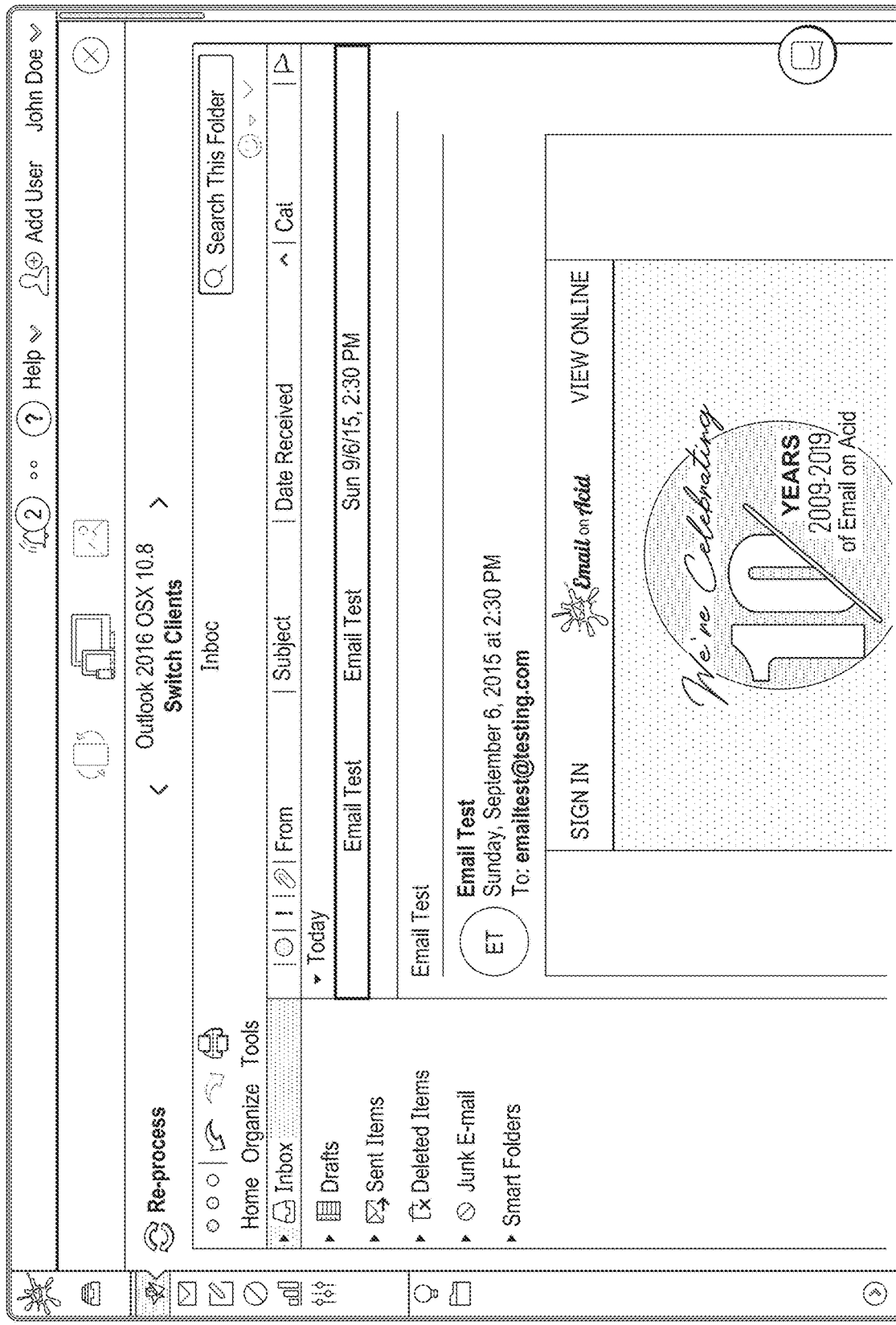
FIG. 35 shows an exemplary interface of the e-mail pre-deployment platform showing a step of email previewing within a particular e-mail client on a particular operating system.

At various points during the workflows of the present disclosure, the platform may include one or more screens of an Email Test/Preview feature wherein the new HTML is previewed to show that it looks stunning across all email clients. Examples are shown in FIGS. 33-35 on e-mail test/preview screens 3300, 3400, and 3500. That is, similar to the validation that occurs in the deliverability workflow shown in FIG. 30, the Test/Preview may run the entire HTML against known rules of e-mail service providers to provide a visual preview for each one. These screens may appear before or after the summary page 3200 in embodiments. As shown in FIG. 33, a user may enter different subject lines in a subject line interface tool 3310, which may then show how the title will appear in across various mobile devices in the mobile device preview window 3320. The actual email preview of the content may be displayed on an email preview screen 3400. It is contemplated that dozens, if not hundreds of known devices may be previewed in embodiments of the platform. FIG. 35 shows an individual detailed preview screen 3500, which shows an exemplary preview of an inbox on a particular email client on a particular device. Such previews may help users detect if there are specific devices and/or e-mail clients that are consistently problematic for viewing certain types of email content.

In embodiments, the order of the overall workflow may be implemented as described herein. However, it is contemplated that other orders may be implemented in order to optimize the experience for the user.

Figure 36:
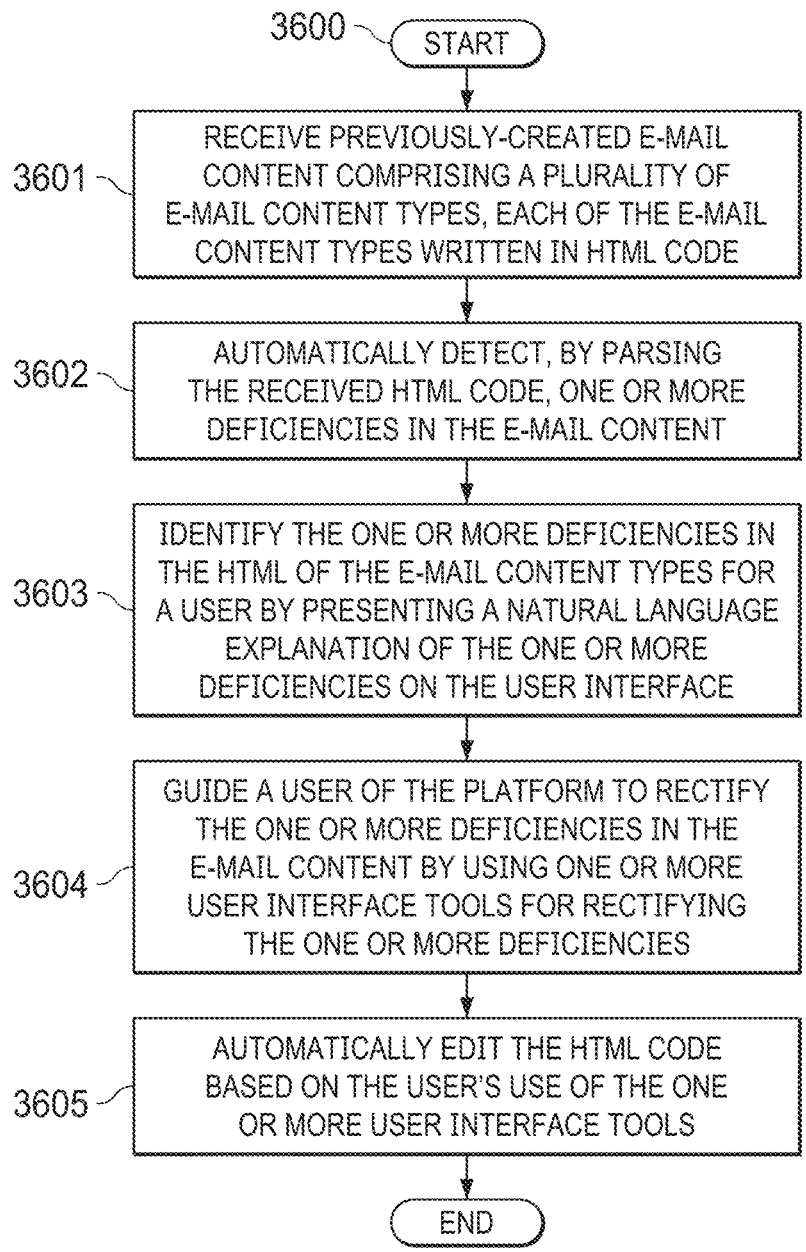
FIG. 36 is a flowchart depicting a method of the present disclosure.

Content Checking
Inbox Display
  Accessibility
    Set Language, Set Content Type, Title Text
    Set Roles/Presentation Tables
    Remove Title Attributes
    Apply Alt Text
    Adjust Contrast Ratio
    Review Links
    Review Zoomed Email
    Advanced View
  URL Validation
    Upload Spreadsheet Page
    URL Validation, Redirect Hops, Device Checks, Preview URL (one page)
    UTM Validation Image Validation
   Image Styling (border, width, height attributes)
   Alt Text and Styling
   Optimize Image Size and Download Map
   GIF Frame Selection
Spell Check
Deliverability
   URL Domain Blacklist Check
   Spam
Email Previews FIG. 36 is a flowchart depicting a method for automatically modifying hyper-text markup language (HMTL) code of an e-mail within an email pre-deployment platform according to an embodiment of the disclosure. The method 3600 may comprise, at step 3601, receiving previously created e-mail content comprising a plurality of e-mail content types, each of the e-mail content types written in HMTL code. The method may then comprise, at step 3602, automatically detecting, by parsing the received HTML code, one or more deficiencies in the e-mail content and, at step 3603, identifying the one or more deficiencies in the HTML of the e-mail content types for a user by presenting a natural language explanation of the one or more deficiencies on the user interface. The method may further comprise, at step 3604, guiding a user of the platform to rectify the one or more deficiencies in the e-mail content by using one or more user interface tools for rectifying the one or more deficiencies and then, at step 3605, automatically editing the HTML code based on the user's use of the one or more user interface tools.

Figure 37:
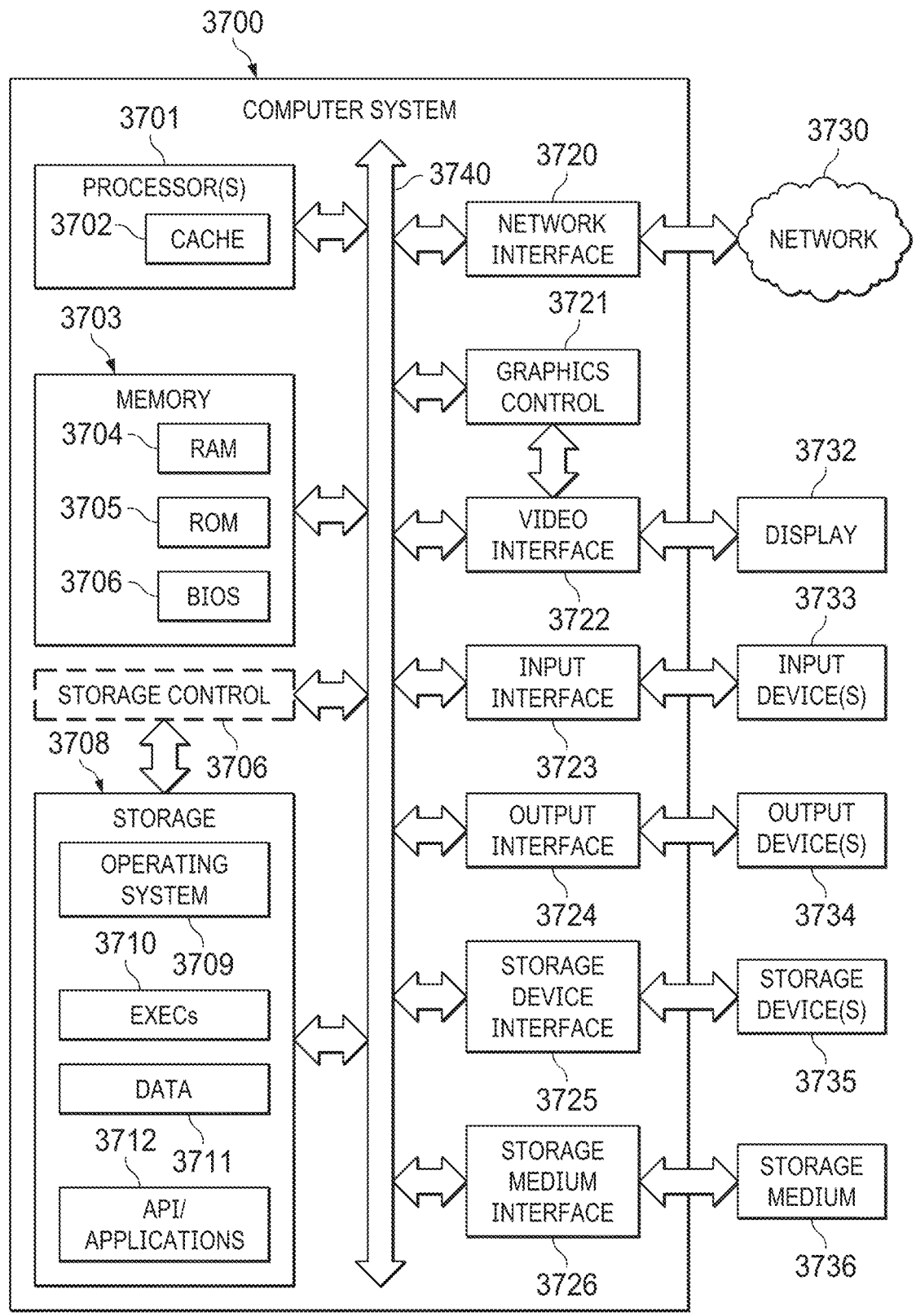
FIG. 37 is a diagram of a computing device which may be used to implement one or more aspects of the present disclosure.

Referring next to FIG. 37, it is a block diagram depicting an exemplary machine that includes a computer system 3700 within which a set of instructions can execute for causing a device to perform or execute any one or more of the aspects and/or methodologies of the present disclosure. The components in FIG. 35 are examples only and do not limit the scope of use or functionality of any hardware, software, embedded logic component, or a combination of two or more such components implementing particular embodiments.

Computer system 3700 may include a processor 3701, a memory 3703, and a storage 3708 that communicate with each other, and with other components, via a bus 3740. The bus 3740 may also link a display 3732, one or more input devices 3733 (which may, for example, include a keypad, a keyboard, a mouse, a stylus, etc.), one or more output devices 3734, one or more storage devices 3735, and various tangible storage media 3736. All of these elements may interface directly or via one or more interfaces or adaptors to the bus 3740. For instance, the various tangible storage media 3736 can interface with the bus 3740 via storage medium interface 3726. Computer system 3700 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 3701 (or central processing unit(s) (CPU(s))) optionally contains a cache memory unit 3702 for temporary local storage of instructions, data, or computer addresses. Processor(s) 3701 are configured to assist in execution of computer readable instructions. Computer system 3700 may provide functionality for the components depicted in FIG. 1 as a result of the processor(s) 3701 executing non-transitory, processor-executable instructions embodied in one or more tangible computer-readable storage media, such as memory 3703, storage 3708, storage devices 3735, and/or storage medium 3736. The computer-readable media may store software that implements particular embodiments, and processor(s) 3701 may execute the software. Memory 3703 may read the software from one or more other computer-readable media (such as mass storage device(s) 3735, 3736) or from one or more other sources through a suitable interface, such as network interface 3720. The software may cause processor(s) 3701 to carry out one or more processes or one or more steps of one or more processes described or illustrated herein. Carrying out such processes or steps may include defining data structures stored in memory 3703 and modifying the data structures as directed by the software.

The memory 3703 may include various components (e.g., machine readable media) including, but not limited to, a random access memory component (e.g., RAM 3704) (e.g., a static RAM "SRAM", a dynamic RAM "DRAM, etc.), a read-only component (e.g., ROM 3705), and any combinations thereof. ROM 3705 may act to communicate data and instructions unidirectionally to processor(s) 3701, and RAM 3704 may act to communicate data and instructions bidirectionally with processor(s) 3701. ROM 3705 and RAM 3704 may include any suitable tangible computer-readable media described below. In one example, a basic input/output system 3706 (BIOS), including basic routines that help to transfer information between elements within computer system 3700, such as during start-up, may be stored in the memory 3703.

Fixed storage 3708 is connected bidirectionally to processor(s) 3701, optionally through storage control unit 3707. Fixed storage 3708 provides additional data storage capacity and may also include any suitable tangible computer-readable media described herein. Storage 3708 may be used to store operating system 3709, EXECs 3710 (executables), data 3711, API applications 3712 (application programs), and the like. Often, although not always, storage 3708 is a secondary storage medium (such as a hard disk) that is slower than primary storage (e.g., memory 3703). Storage 3708 can also include an optical disk drive, a solid-state memory device (e.g., flash-based systems), or a combination of any of the above. Information in storage 3708 may, in appropriate cases, be incorporated as virtual memory in memory 3703.

In one example, storage device(s) 3735 may be removably interfaced with computer system 3700 (e.g., via an external port connector (not shown)) via a storage device interface 3725. Particularly, storage device(s) 3735 and an associated machine-readable medium may provide nonvolatile and/or volatile storage of machine-readable instructions, data structures, program modules, and/or other data for the computer system 3700. In one example, software may reside, completely or partially, within a machine-readable medium on storage device(s) 3735. In another example, software may reside, completely or partially, within processor(s) 3701.

Bus 3740 connects a wide variety of subsystems. Herein, reference to a bus may encompass one or more digital signal lines serving a common function, where appropriate. Bus 3740 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 3700 may also include an input device 3733. In one example, a user of computer system 3700 may enter commands and/or other information into computer system 3700 via input device(s) 3733. Examples of an input device(s) 3733 include, but are not limited to, an alphanumeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 3733 may be interfaced to bus 3740 via any of a variety of input interfaces 3723 (e.g., input interface 3723) including, but not limited to, serial, parallel, game port, USB, FIREWIRE, THUNDERBOLT, or any combination of the above.

In particular embodiments, when computer system 3700 is connected to network 3730, computer system 3700 may communicate with other devices, specifically mobile devices and enterprise systems, connected to network 3730. Communications to and from computer system 3700 may be sent through network interface 3720. For example, network interface 3720 may receive incoming communications (such as requests or responses from other devices) in the form of one or more packets (such as Internet Protocol (IP) packets) from network 3730, and computer system 3700 may store the incoming communications in memory 3703 for processing. Computer system 3700 may similarly store outgoing communications (such as requests or responses to other devices) in the form of one or more packets in memory 3703 and communicated to network 3730 from network interface 3720. Processor(s) 3701 may access these communication packets stored in memory 3703 for processing.

Examples of the network interface 3720 include, but are not limited to, a network interface card, a modem, and any combination thereof. Examples of a network 3730 or network segment 3730 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 3730, may employ a wired and/or a wireless mode of communication. In general, any network topology may be used.

Information and data can be displayed through a display 3732. Examples of a display 3732 include, but are not limited to, a liquid crystal display (LCD), an organic liquid crystal display (OLED), a cathode ray tube (CRT), a plasma display, and any combinations thereof. The display 3732 can interface to the processor(s) 3701, memory 3703, and fixed storage 3708, as well as other devices, such as input device(s) 3733, via the bus 3740. The display 3732 is linked to the bus 3740 via a video interface 3722, and transport of data between the display 3732 and the bus 3740 can be controlled via the graphics control 3721.

In addition to a display 3732, computer system 3700 may include one or more other peripheral output devices 3734 including, but not limited to, an audio speaker, a printer, and any combinations thereof. Such peripheral output devices may be connected to the bus 3740 via an output interface 3724. Examples of an output interface 3724 include, but are not limited to, a serial port, a parallel connection, a USB port, a FIREWIRE port, a THUNDERBOLT port, and any combinations thereof.

In addition or as an alternative, computer system 3700 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for automatically testing and previewing hyper-text markup language (HTML) code of an e-mail within an email pre-deployment platform, the method comprising:
   receiving previously-created e-mail content from a user, wherein the previously-created e-mail content is in a pre-deployment state prior to being sent through an e-mail sending service, comprising a plurality of e-mail content types, each of the plurality of e-mail content types written in HTML code;
   presenting the user with one or more workflows via a drop down menu, the one or more workflows comprising a series of checks and automatic update processes within the pre-deployment platform, wherein the user selects at least one of the one or more workflows;
   checking, by parsing the received HTML code, for any unintended recipient experiences and undesired formatting outcomes resulting from a display of the HTML code of one or more of the plurality of e-mail content types by at least image validation and one or more of:
      testing for accessibility issues;
      Uniform Resource Locator (URL) validation;
      spell checking; and
      deliverability validation;
   wherein the image validation comprises detecting if at least one image in the e-mail has a load time exceeding a threshold;
   upon checking, determining if the previously created e-mail content comprises at least one unintended recipient experience or undesired formatting outcome;
   displaying, to the user, a natural language explanation of the at least one unintended recipient experience or undesired formatting outcome on a user interface, based on determining that the previously created e-mail content comprises the at least one unintended recipient experience or undesired formatting outcome;
   presenting the user with one or more automatic user interface correction tools, the one or more automatic user interface correction tools configured to automatically rectify the at least one unintended recipient experience or undesired formatting outcome described by the natural language explanation;
   automatically editing the HTML code of the one or more of the plurality of e-mail content types based on the user selecting one of the one or more automatic user interface correction tools;
   automatically editing the HTML code to compress the at least one image;
   displaying a dynamic rendering window on the user interface, wherein the dynamic rendering window is configured to display the e-mail content and make changes in real time or substantially real time to the displayed e-mail content based on the user inputting the instruction into the one or more automatic user interface correction tools; and
   displaying at least one new image in the dynamic rendering window, wherein each image of the at least one new image is a compressed version of one of the at least one image.

2. The method of claim 1, wherein the plurality of e-mail content types comprise each of:
   text content;
   images; and
   links.

3. The method of claim 1, wherein the previously created e-mail content is received from the user sending an e-mail with the previously created e-mail content to the e-mail pre-deployment platform, and wherein each of the plurality of e-mail content types comprises a MIME-type declaration.

4. The method of claim 1, wherein the instruction input into the one or more automatic user interface correction tools is received via a text input field or a button.

5. The method of claim 1, wherein the at least one unintended recipient experience or undesired formatting outcome resulting from the display of the HTML code of the one or more of the plurality of email content comprises failing to meet an accessibility standard, and wherein the one or more automatic user interface correction tools for rectifying the at least one unintended recipient experience or undesired formatting outcome comprises an option to modify the HTML code of the one or more of the plurality of e-mail content types such that it meets the accessibility standard.

6. The method of claim 5, wherein the one or more automatic user interface correction tools allows the user to rectify missing alt-text, allows the user to adjust the contrast of the text, or a combination thereof.

7. The method of claim 5, wherein the one or more automatic user interface correction tools allows the user to select one or more colors to omit, and wherein the dynamic rendering window displays the e-mail in a simulation in which the one or more colors are omitted.

8. The method of claim 1, further comprising:
   providing previews of the e-mail content as it would appear in each of:
      a plurality of different e-mail clients; and
      on a plurality of different computing devices.

9. The method of claim 8, wherein the e-mail content comprises a plurality of URL links, and comprises the URL validation, wherein the URL validation comprises:
   testing each of the plurality of URL links across the plurality of different computing devices, wherein the plurality of different computing devices comprises at least one desktop device and at least one mobile device, and wherein the plurality of URL links comprise non-mobile specific URL links, mobile-specific URL links, or a combination thereof; and
   determining whether at least one of the plurality of URL links is associated with any unintended recipient experience and undesired formatting outcome selected from a group consisting of a broken link, a rendering issue for a non-mobile specific URL link on a mobile device, and a rendering issue for a mobile-specific URL link on a desktop device.

10. The method of claim 9, further comprising:
    identifying that at least one URL link of the plurality of URL links is an unsecure link;
    determining whether the at least one URL link comprises a security certificate; and automatically changing the at least one URL link to a secure link.

11. The method of claim 10, wherein the secure link comprises a HTTPS prefix and the unsecure link comprises a HTTP prefix, the method further comprising:
automatically checking whether the secure link and the unsecure link resolve to a same address.

12. The method of claim 9, further comprising:
receiving, from the user, one or more changes to an URL link of the plurality of URL links; and
displaying a preview of the URL link including the one or more changes in the dynamic rendering window.

13. The method of claim 1, wherein delivery validation further comprises one or more of:
running a blacklist check for the e-mail, wherein the blacklist check comprises checking for blacklisted URL domains in the e-mail content; and
running a spam check for the e-mail, wherein the spam check comprises evaluating a subject line of the e-mail against a list of blocked e-mail subject lines;
and wherein the method further comprises:
presenting, to the user, results pertaining to one or more of the blacklist check and the spam check on the user interface.

14. The method of claim 1, wherein automatically editing the HTML code of the one or more of the plurality of e-mail content types further comprises:
presenting, via the user interface, the user with one or more changes that are automatically being made to HTML code of the email based on the user inputting the instruction into the one or more automatic user interface correction tools;
and wherein the HTML code is dynamically altered and displayed to the user in real-time or substantially real-time.

15. The method of claim 1, further comprising:
verbally reading the e-mail to the user, wherein verbally reading the email comprises simulating one or more of a voice-activated digital assistant system, an assistive reading application or device, and a smart speaker.

16. A non-transitory, tangible computer readable storage medium, encoded with processor readable instructions to perform a method for automatically testing and previewing hyper-text markup language (HTML) code of an e-mail within an email pre-deployment platform, the method comprising:
receiving previously-created e-mail content, wherein the previously-created e-mail content is in a pre-deployment state prior to being sent through an e-mail sending service, comprising a plurality of e-mail content types, each of the plurality of e-mail content types written in HTML code;
presenting the user with one or more workflows via a drop down menu, the one or more workflows comprising a series of checks and automatic update processes within the pre-deployment platform, wherein the user selects at least one of the one or more workflows;
checking, by parsing the received HTML code, for any unintended recipient experiences and undesired formatting outcomes resulting from a display of the HTML code of one or more of the plurality of e-mail content types by image validation and one or more of:
testing for accessibility issues;
Uniform Resource Locator (URL) validation;
spell checking; and
deliverability validation;

wherein the image validation comprises detecting if at least one image in the e-mail has a load time exceeding a threshold;
upon checking, determining if the previously created e-mail content comprises at least one unintended recipient experience or undesired formatting outcome;
displaying, to the user, a natural language explanation of at least one unintended recipient experience or undesired formatting outcome on a user interface based on determining that the previously created e-mail content comprises the at least one unintended recipient experience or undesired formatting outcome;
presenting the user with one or more automatic user interface correction tools, the one or more automatic user interface correction tools configured to automatically rectify the at least one unintended recipient experience or undesired formatting outcome described by the natural language explanation;
automatically editing the HTML code of the one or more of the plurality of e-mail content types based on the user selecting one of the one or more automatic user interface correction tools;
automatically editing the HTML code to compress the at least one image;
displaying a dynamic rendering window on the user interface, wherein the dynamic rendering window is configured to display the e-mail content and make changes in real time or substantially real time to the displayed e-mail content based on the user inputting the instruction into the one or more automatic user interface correction tools; and
displaying at least one new image in the dynamic rendering window, wherein each image of the at least one new image is a compressed version of one of the at least one image.

17. The non-transitory, tangible computer readable storage medium of claim 16, wherein deliverability validation further comprises one or more of:
running a blacklist check for the e-mail, wherein the blacklist check comprises checking for blacklisted URL domains in the e-mail content; and
running a spam check for the e-mail, wherein the spam check comprises evaluating a subject line of the e-mail against a list of blocked e-mail subject lines;
and wherein the method further comprises:
presenting, to the user, results pertaining to one or more of the blacklist check and the spam check on the user interface.

18. A system for automatically testing and previewing hyper-text markup language (HTML) code of an e-mail within an email pre-deployment platform, the system comprising:
one or more hardware processors configured by machine-readable instructions to:
receive previously-created e-mail content, wherein the previously-created e-mail content is in a pre-deployment state prior to being sent through an e-mail sending service, comprising a plurality of e-mail content types, each of the plurality of e-mail content types written in HTML code;
present the user with one or more workflows via a drop down menu, the one or more workflows comprising a series of checks and automatic update processes within the pre-deployment platform, wherein the user selects at least one of the one or more workflows;

check, by parsing the received HTML code, for any unintended recipient experiences and undesired formatting outcomes resulting from a display of the HTML code of one or more of the plurality of e-mail content types by image validation and one or more of:
  testing for accessibility issues;
  Uniform Resource Locator (URL) validation;
  spell checking; and
  deliverability validation;
wherein the image validation comprises detecting if at least one image in the e-mail has a load time exceeding a threshold;
upon checking, determine if the previously created e-mail content comprises at least one unintended recipient experience or undesired formatting outcome;
display, to the user, a natural language explanation of the at least one unintended recipient experience or undesired formatting outcome on a user interface, based on determining that the previously created e-mail content comprises the at least one unintended recipient experience or undesired formatting outcome;
present the user with one or more automatic user interface correction tools, the one or more automatic user interface correction tools configured to automatically rectify the at least one unintended recipient experience or undesired formatting outcome described by the natural language explanation;
automatically edit the HTML code of the one or more of the plurality of e-mail content types based on the user selecting one of the one or more automatic user interface correction tools;
automatically edit the HTML code to compress the at least one image;
display a dynamic rendering window on the user interface, wherein the dynamic rendering window is configured to display the e-mail content and make changes in real time or substantially real time to the displayed e-mail content based on the user inputting the instruction into the one or more automatic user interface correction tools; and
display at least one new image in the dynamic rendering window, wherein each image of the at least one new image is a compressed version of one of the at least one image.

\* \* \* \* \*